United States Patent

Mase et al.

[11] Patent Number: 5,978,820
[45] Date of Patent: Nov. 2, 1999

[54] TEXT SUMMARIZING METHOD AND SYSTEM

[75] Inventors: Hisao Mase, Hirakata; Hiroshi Tsuji, Itami, both of Japan

[73] Assignee: Hitachi, Ltd., Tokyo, Japan

[21] Appl. No.: 08/622,892

[22] Filed: Mar. 29, 1996

[30] Foreign Application Priority Data

Mar. 31, 1995 [JP] Japan .................................. 7-100028

[51] Int. Cl.$^6$ .................................................. G06F 17/27
[52] U.S. Cl. ................................................................ 707/531
[58] Field of Search ................................... 707/531, 508, 707/4, 5

[56] References Cited

U.S. PATENT DOCUMENTS

| | | | |
|---|---|---|---|
| 5,371,673 | 12/1994 | Fan | 704/1 |
| 5,392,428 | 2/1995 | Robins | 707/3 |
| 5,442,780 | 8/1995 | Takanashi et al. | 707/1 |
| 5,493,677 | 2/1996 | Balogh et al. | 707/104 |

*Primary Examiner*—Anton Fetting
*Attorney, Agent, or Firm*—Fay, Sharpe, Beall, Fagan, Minnich & McKee

[57] ABSTRACT

By storing data on text attributes comprising a plurality of attribute items, a text analysis rule, a plurality of text type identification rules, a plurality of text content/domain type identification rules, a plurality of summarization method setting tables, and a summarization rule in a storage, analysing an inputted text in an electronic form on the basis of the text analysis rule and the data on text attributes, generating a text analysis table, determining the text type of the inputted text in an electronic form on the basis of the text type identification rules and the content of the text analysis table, also determining the text content/domain type on the basis of the text content/domain type identification rules, selecting a summarization method setting table corresponding to a combination of the determined text type and text content/domain type, and summarizing the inputted text in an electronic form on the basis of the summarization method setting table and the summarization rule, a text summarizing method and system for preventing the correctness of text summarization from dropping due to a difference in the constitution, field, and content of a text.

18 Claims, 26 Drawing Sheets

| ATTRIBUTE ITEM CODE (201) | ATTRIBUTE ITEM NAME (202) | TYPE OF ATTRIBUTE VALUE (203) |
|---|---|---|
| A01 | NUMBER OF CHARACTERS | NUMERICAL VALUE |
| A02 | NUMBER OF WORDS | NUMERICAL VALUE |
| A03 | NUMBER OF PARAGRAPHS | NUMERICAL VALUE |
| A04 | NUMBER OF SENTENCES | NUMERICAL VALUE |
| A05 | AVERAGE NUMBER OF SENTENCES IN A PARAGRAPH | NUMERICAL VALUE |
| A06 | AVERAGE NUMBER OF WORDS IN A SENTENCE | NUMERICAL VALUE |
| A07 | AVERAGE NUMBER OF CHARACTERS IN A SENTENCE | NUMERICAL VALUE |
| A08 | SPECIFIC CHARACTER STRING | CHARACTER STRING |
| A09 | OCCURRENCE FREQUENCY OF OPINION SENTENCE | NUMERICAL VALUE |
| A10 | OCCURRENCE FREQUENCY OF IMPERATIVE SENTENCE | NUMERICAL VALUE |
| A11 | OCCURRENCE FREQUENCY OF POLITE SENTENCE | NUMERICAL VALUE |
| A12 | OCCURRENCE FREQUENCY OF PAST SENTENCE | NUMERICAL VALUE |
| A13 | OCCURRENCE FREQUENCY OF CONVERSATIONAL SENTENCE | NUMERICAL VALUE |
| A14 | OCCURRENCE FREQUENCY OF COLLOQUIAL SENTENCE | NUMERICAL VALUE |

*FIG. 4*

WINDOW FOR DEFINING TEXT TYPE IDENTIFICATION RULES

[REGISTER] [CANCEL] [HELP]

| NAME OF TEXT TYPE IDENTIFIER | NEWSPAPER ARTICLE | 305 307 306 |
|---|---|---|

| ATTRIBUTE ITEM NAME | ATTRIBUTE VALUE | REGISTERED IDENTIFIER |
|---|---|---|
| NUMBER OF CHARACTERS | MORE THAN 300 LESS THAN 1500 | NEWSPAPER ARTICLE |
| NUMBER OF WORDS | MORE THAN 100 LESS THAN 750 | |
| NUMBER OF PARAGRAPHS | LESS THAN 5 | |
| NUMBER OF SENTENCES | LESS THAN 10 | |
| AVERAGE NUMBER OF SENTENCES IN A PARAGRAPH | | |
| AVERAGE NUMBER OF WORDS IN A SENTENCE | MORE THAN 20 LESS THAN 50 | |
| AVERAGE NUMBER OF CHARACTERS IN A SENTENCE | | |
| SPECIFIC CHARACTER STRING | | |
| OCCURRENCE FREQUENCY OF OPINION SENTENCE | LESS THAN 20 | |
| OCCURRENCE FREQUENCY OF IMPERATIVE SENTENCE | 0 | |
| OCCURRENCE FREQUENCY OF POLITE SENTENCE | 0 | |
| OCCURRENCE FREQUENCY OF PAST SENTENCE | MORE THAN 30 | |
| OCCURRENCE FREQUENCY OF CONVERSATIONAL SENTENCE | | |
| OCCURRENCE FREQUENCY OF COLLOQUIAL SENTENCE | 0 | |

WINDOW FOR DEFINING TEXT TYPE IDENTIFICATION RULES — REGISTER | CANCEL | HELP

NAME OF TEXT TYPE IDENTIFIER: REQUEST MESSAGE

| ATTRIBUTE ITEM NAME | ATTRIBUTE VALUE |
|---|---|
| NUMBER OF CHARACTERS | LESS THAN 1000 |
| NUMBER OF WORDS | |
| NUMBER OF PARAGRAPHS | |
| NUMBER OF SENTENCES | |
| AVERAGE NUMBER OF SENTENCES IN A PARAGRAPH | |
| AVERAGE NUMBER OF WORDS IN A SENTENCE | LESS THAN 20 |
| AVERAGE NUMBER OF CHARACTERS IN A SENTENCE | |
| SPECIFIC CHARACTER STRING | |
| OCCURRENCE FREQUENCY OF OPINION SENTENCE | |
| OCCURRENCE FREQUENCY OF IMPERATIVE SENTENCE | MORE THAN 10 |
| OCCURRENCE FREQUENCY OF POLITE SENTENCE | MORE THAN 30 |
| OCCURRENCE FREQUENCY OF PAST SENTENCE | |
| OCCURRENCE FREQUENCY OF CONVERSATIONAL SENTENCE | |
| OCCURRENCE FREQUENCY OF COLLOQUIAL SENTENCE | |

REGISTERED IDENTIFIER:
- NEWSPAPER ARTICLE
- REQUEST MESSAGE

| | | | | | 200 | |
|---|---|---|---|---|---|---|
| TEXT TYPE IDENTIFIER: NEWSPAPER ARTICLE ||||||| 
| ATTRIBUTE ITEM CODE | ATTRIBUTE ITEM NAME | TYPE OF ATTRIBUTE VALUE | MAX. VALUE | MIN. VALUE | CHARACTER STRING |
| 201 | 202 | 203 | 204 | 205 | 206 |
| A01 | NUMBER OF CHARACTERS | NUMERICAL VALUE | 1500 | 300 | |
| A02 | NUMBER OF WORDS | NUMERICAL VALUE | 750 | 100 | |
| A03 | NUMBER OF PARAGRAPHS | NUMERICAL VALUE | | 5 | |
| A04 | NUMBER OF SENTENCES | NUMERICAL VALUE | | 10 | |
| A05 | AVERAGE NUMBER OF SENTENCES IN A PARAGRAPH | NUMERICAL VALUE | | | |
| A06 | AVERAGE NUMBER OF WORDS IN A SENTENCE | NUMERICAL VALUE | 50 | 20 | |
| A07 | AVERAGE NUMBER OF CHARACTERS IN A SENTENCE | NUMERICAL VALUE | | | |
| A08 | SPECIFIC CHARACTER STRING | CHARACTER STRING | | | |
| A09 | OCCURRENCE FREQUENCY OF OPINION SENTENCE | NUMERICAL VALUE | 0.2 | | |
| A10 | OCCURRENCE FREQUENCY OF IMPERATIVE SENTENCE | NUMERICAL VALUE | 0 | 0 | |
| A11 | OCCURRENCE FREQUENCY OF POLITE SENTENCE | NUMERICAL VALUE | 0 | 0 | |
| A12 | OCCURRENCE FREQUENCY OF PAST SENTENCE | NUMERICAL VALUE | | 0.3 | |
| A13 | OCCURRENCE FREQUENCY OF CONVERSATIONAL SENTENCE | NUMERICAL VALUE | | | |
| A14 | OCCURRENCE FREQUENCY OF COLLOQUIAL SENTENCE | NUMERICAL VALUE | 0 | 0 | |

FIG. 7

| | | |
|---|---|---|
| WINDOW FOR DEFINING TEXT CONTENT/ DOMAIN TYPE IDENTIFICATION RULES | REGISTER | CANCEL | HELP |

NAME OF TEXT TYPE IDENTIFIER — NEWSPAPER ARTICLE

NAME OF TEXT CONTENT/DOMAIN TYPE IDENTIFIER — EXCHANGE 1

| ATTRIBUTE ITEM NAME | ATTRIBUTE VALUE |
|---|---|
| NUMBER OF CHARACTERS | MORE THAN 300 LESS THAN 1500 |
| NUMBER OF WORDS | MORE THAN 100 LESS THAN 750 |
| NUMBER OF PARAGRAPHS | LESS THAN 5 |
| NUMBER OF SENTENCES | LESS THAN 10 |
| AVERAGE NUMBER OF SENTENCES IN A PARAGRAPH | |
| AVERAGE NUMBER OF WORDS IN A SENTENCE | MORE THAN 20 LESS THAN 50 |
| AVERAGE NUMBER OF CHARACTERS IN A SENTENCE | |
| SPECIFIC CHARACTER STRING | |
| OCCURRENCE FREQUENCY OF OPINION SENTENCE | LESS THAN 20 |
| OCCURRENCE FREQUENCY OF IMPERATIVE SENTENCE | 0 |
| OCCURRENCE FREQUENCY OF POLITE SENTENCE | 0 |
| OCCURRENCE FREQUENCY OF PAST SENTENCE | MORE THAN 30 |
| OCCURRENCE FREQUENCY OF CONVERSATIONAL SENTENCE | |
| OCCURRENCE FREQUENCY OF COLLOQUIAL SENTENCE | 0 |
| WORD THAT ALWAYS OCCURS | EXCHANGE/YEN/ DOLLAR |
| WORD OF FREQUENT OCCURRENCE | MARKET/QUOT- ATION/SELL/BUY |
| SUMMARIZATION KEYWORD | CLOSING PRICE/ VOLUME |

REGISTERED IDENTIFIER

NEWSPAPER ARTICLE : EXCHANGE 1

| ATTRIBUTE ITEM CODE | ATTRIBUTE ITEM NAME | TYPE OF ATTRIBUTE VALUE | MAX. VALUE | MIN. VALUE | CHARACTER STRING |
|---|---|---|---|---|---|
| 201 | 202 | 203 | 204 | 205 | 206 |
| A01 | NUMBER OF CHARACTERS | NUMERICAL VALUE | 1500 | 300 | |
| A02 | NUMBER OF WORDS | NUMERICAL VALUE | 750 | 100 | |
| A03 | NUMBER OF PARAGRAPHS | NUMERICAL VALUE | | 5 | |
| A04 | NUMBER OF SENTENCES | NUMERICAL VALUE | | 10 | |
| A05 | AVERAGE NUMBER OF SENTENCES IN A PARAGRAPH | NUMERICAL VALUE | | | |
| A06 | AVERAGE NUMBER OF WORDS IN A SENTENCE | NUMERICAL VALUE | 50 | 20 | |
| A07 | AVERAGE NUMBER OF CHARACTERS IN A SENTENCE | NUMERICAL VALUE | | | |
| A08 | SPECIFIC CHARACTER STRING | CHARACTER STRING | | | |
| A09 | OCCURRENCE FREQUENCY OF OPINION SENTENCE | NUMERICAL VALUE | 0.2 | | |
| A10 | OCCURRENCE FREQUENCY OF IMPERATIVE SENTENCE | NUMERICAL VALUE | 0 | 0 | |
| A11 | OCCURRENCE FREQUENCY OF POLITE SENTENCE | NUMERICAL VALUE | 0 | 0 | |
| A12 | OCCURRENCE FREQUENCY OF PAST SENTENCE | NUMERICAL VALUE | | 0.3 | |
| A13 | OCCURRENCE FREQUENCY OF CONVERSATIONAL SENTENCE | NUMERICAL VALUE | | | |
| A14 | OCCURRENCE FREQUENCY OF COLLOQUIAL SENTENCE | NUMERICAL VALUE | 0 | 0 | |
| B01 | WORD THAT ALWAYS OCCURS | CHARACTER STRING | | | EXCHANGE |
| B01 | WORD THAT ALWAYS OCCURS | CHARACTER STRING | | | YEN |
| B01 | WORD THAT ALWAYS OCCURS | CHARACTER STRING | | | DOLLAR |
| B02 | WORD OF FREQUENT OCCURRENCE | CHARACTER STRING | | | MARKET |
| B02 | WORD OF FREQUENT OCCURRENCE | CHARACTER STRING | | | QUOTATION |
| B02 | WORD OF FREQUENT OCCURRENCE | CHARACTER STRING | | | SELL |
| B02 | WORD OF FREQUENT OCCURRENCE | CHARACTER STRING | | | BUY |
| B03 | SUMMARIZATION KEYWORD | CHARACTER STRING | | | CLOSING PRICE |
| B03 | SUMMARIZATION KEYWORD | CHARACTER STRING | | | VOLUME |

TEXT TYPE IDENTIFIER: NEWSPAPER ARTICLE
TEXT CONTENT/DOMAIN TYPE IDENTIFIER: EXCHANGE 1

*FIG. 9*

| SETTING ITEM CODE | SETTING ITEM NAME | SETTING VALUE |
|---|---|---|
| | TEXT TYPE IDENTIFIER: NEWSPAPER ARTICLE | |
| | TEXT CONTENT/DOMAIN TYPE IDENTIFIER: EXCHANGE 1 | |
| AB01 | HEAD SENTENCE OF THE TEXT | 0 |
| AB02 | HEAD SENTENCE OF EACH PARAGRAPH | 2 |
| AB03 | FACT SENTENCE | 2 |
| AB04 | OPINION SENTENCE | 2 |
| AB05 | IMPERATIVE SENTENCE | 2 |
| AB06 | ADVERB | 1 |
| AB07 | CONJUNCTION | 1 |
| AB08 | SENTENCE THAT INCLUDES SUMMARIZATION KEYWORD | 0 |
| | TEXT TYPE IDENTIFIER: REQUEST MESSAGE | |
| | TEXT CONTENT/DOMAIN TYPE IDENTIFIER: (DEFAULT VALUE) | |
| AB01 | HEAD SENTENCE OF THE TEXT | 2 |
| AB02 | HEAD SENTENCE OF EACH PARAGRAPH | 2 |
| AB03 | FACT SENTENCE | 2 |
| AB04 | OPINION SENTENCE | 2 |
| AB05 | IMPERATIVE SENTENCE | 0 |
| AB06 | ADVERB | 1 |
| AB07 | CONJUNCTION | 1 |
| AB08 | SENTENCE THAT INCLUDES SUMMARIZATION KEYWORD | 2 |
| | TEXT TYPE IDENTIFIER: (DEFAULT VALUE) | |
| | TEXT CONTENT/DOMAIN TYPE IDENTIFIER: (DEFAULT VALUE) | |
| AB01 | HEAD SENTENCE OF THE TEXT | 2 |
| AB02 | HEAD SENTENCE OF EACH PARAGRAPH | 0 |
| AB03 | FACT SENTENCE | 2 |
| AB04 | OPINION SENTENCE | 2 |
| AB05 | IMPERATIVE SENTENCE | 2 |
| AB06 | ADVERB | 1 |
| AB07 | CONJUNCTION | 1 |
| AB08 | SENTENCE THAT INCLUDES SUMMARIZATION KEYWORD | 2 |

| SETTING ITEM CODE | SETTING ITEM NAME | TEXT ANALYSIS RULE |
|---|---|---|
| A09 | OCCURRENCE FREQUENCY OF OPINION SENTENCE | WORD= "べき" (BEKI) |
| A09 | OCCURRENCE FREQUENCY OF OPINION SENTENCE | STRS= "と思う" (TO OMOU) |
| A09 | OCCURRENCE FREQUENCY OF OPINION SENTENCE | STRS= "と考える" (TO KANGAERU) |
| A10 | OCCURRENCE FREQUENCY OF IMPERATIVE SENTENCE | LAST= "下さい" (KUDASAI) |
| A10 | OCCURRENCE FREQUENCY OF IMPERATIVE SENTENCE | LAST= "せよ" (SEYO) |
| A11 | OCCURRENCE FREQUENCY OF POLITE SENTENCE | LAST= "ます" (MASU) |
| A11 | OCCURRENCE FREQUENCY OF POLITE SENTENCE | LAST= "です" (DESU) |
| A11 | OCCURRENCE FREQUENCY OF POLITE SENTENCE | LAST= "下さい" (KUDASAI) |
| A12 | OCCURRENCE FREQUENCY OF PAST SENTENCE | LAST= "た" (TA) |
| A13 | OCCURRENCE FREQUENCY OF CONVERSATIONAL SENTENCE | STRS= "」と" (TO) |
| A14 | OCCURRENCE FREQUENCY OF COLLOQUIAL SENTENCE | LAST= "よ" (YO) |
| A14 | OCCURRENCE FREQUENCY OF COLLOQUIAL SENTENCE | LAST= "ね" (NE) |

WORD TABLE

| PARAGRAPH NO. 1001 | SENTENCE NO. 1002 | WORD NO. 1003 | WORDS 1004 | PART OF SPEECH 1005 |
|---|---|---|---|---|
| 1 | 1 | 1 | " " | SPACE |
| 1 | 1 | 2 | "円" (yen) | NOUN |
| 1 | 1 | 3 | "相場" (souba) | NOUN |
| ⋮ | | | | |
| 1 | 1 | 39 | "更新し" (koushinshi) | VERB |
| 1 | 1 | 40 | "た" (ta) | AUXILIARY VERB |
| 1 | 1 | 41 | "。" (.) | PERIOD |
| 2 | 1 | 1 | " " | SPACE |
| 2 | 1 | 2 | "この" (kono) | ADJECTIVE |
| ⋮ | | | | |

FIG. 20b

TEXT TABLE

| ATTRIBUTE ITEM CODE (201) | ATTRIBUTE ITEM NAME (202) | ATTRIBUTE VALUE (950) |
|---|---|---|
| A01 | NUMBER OF CHARACTERS | 401 |
| A02 | NUMBER OF WORDS | 198 |
| A03 | NUMBER OF PARAGRAPHS | 4 |
| A04 | NUMBER OF SENTENCES | 8 |
| A05 | AVERAGE NUMBER OF SENTENCES IN A PARAGRAPH | 2.0 |
| A06 | AVERAGE NUMBER OF WORDS IN A SENTENCE | 24.8 |
| A07 | AVERAGE NUMBER OF CHARACTERS IN A SENTENCE | 50.1 |
| A08 | SPECIFIC CHARACTER STRING | — |
| A09 | OCCURRENCE FREQUENCY OF OPINION SENTENCE | 0.0 |
| A10 | OCCURRENCE FREQUENCY OF IMPERATIVE SENTENCE | 0.0 |
| A11 | OCCURRENCE FREQUENCY OF POLITE SENTENCE | 0.0 |
| A12 | OCCURRENCE FREQUENCY OF PAST SENTENCE | 75.0 |
| A13 | OCCURRENCE FREQUENCY OF CONVERSATIONAL SENTENCE | 0.0 |
| A14 | OCCURRENCE FREQUENCY OF COLLOQUIAL SENTENCE | 0.0 |

FIG. 21a

WORD TABLE

| PARAGRAPH NO. 1001 | SENTENCE NO. 1002 | WORD NO. 1003 | WORDS 1004 | PART OF SPEECH 1005 |
|---|---|---|---|---|
| 1 | 1 | 1 | " " | SPACE |
| 1 | 1 | 2 | "拝啓" (haikei) | NOUN |
| 1 | 1 | 3 | "、" (,) | COMMA |
| ⋮ | | | | |
| 1 | 1 | 9 | "おり" (ori) | VERB |
| 1 | 1 | 10 | "ます" (masu) | AUXILIARY VERB |
| 1 | 1 | 11 | "。" (.) | PERIOD |
| 2 | 1 | 1 | " " | SPACE |
| 2 | 1 | 2 | "実" (jitsu) | NOUN |
| 2 | 1 | 3 | "は" (wa) | PARTICLE |
| ⋮ | | | | |

FIG. 21b

TEXT TABLE

| ATTRIBUTE ITEM CODE (201) | ATTRIBUTE ITEM NAME (202) | ATTRIBUTE VALUE (950) |
|---|---|---|
| A01 | NUMBER OF CHARACTERS | 175 |
| A02 | NUMBER OF WORDS | 105 |
| A03 | NUMBER OF PARAGRAPHS | 3 |
| A04 | NUMBER OF SENTENCES | 10 |
| A05 | AVERAGE NUMBER OF SENTENCES IN A PARAGRAPH | 3.3 |
| A06 | AVERAGE NUMBER OF WORDS IN A SENTENCE | 10.5 |
| A07 | AVERAGE NUMBER OF CHARACTERS IN A SENTENCE | 17.5 |
| A08 | SPECIFIC CHARACTER STRING | — |
| A09 | OCCURRENCE FREQUENCY OF OPINION SENTENCE | 0.0 |
| A10 | OCCURRENCE FREQUENCY OF IMPERATIVE SENTENCE | 20.0 |
| A11 | OCCURRENCE FREQUENCY OF POLITE SENTENCE | 70.0 |
| A12 | OCCURRENCE FREQUENCY OF PAST SENTENCE | 0.0 |
| A13 | OCCURRENCE FREQUENCY OF CONVERSATIONAL SENTENCE | 0.0 |
| A14 | OCCURRENCE FREQUENCY OF COLLOQUIAL SENTENCE | 10.0 |

| ATTRIBUTE ITEM CODE | ATTRIBUTE ITEM NAME | TEXT SUMMARIZATION RULE |
|---|---|---|
| AB03 | FACT SENTENCE | LAST= "だ" (DA) |
| AB03 | FACT SENTENCE | LAST= "である" (DEARU) |
| AB03 | FACT SENTENCE | LAST= "する" (SURU) |
| AB03 | FACT SENTENCE | LAST= "いる" (IRU) |
| AB03 | FACT SENTENCE | LAST= "た" (TA) |
| AB04 | OPINION SENTENCE | STRS= "と思う" (TO OMOU) |
| AB04 | OPINION SENTENCE | STRS= "と考える" (TO KANGAERU) |
| AB04 | OPINION SENTENCE | WORD= "べき" (BEKI) |
| AB05 | IMPERATIVE SENTENCE | LAST= "下さい" (KUDASAI) |
| AB05 | IMPERATIVE SENTENCE | LAST= "せよ" (SEYO) |
| AB06 | ADVERB | PART=ADVERB |
| AB07 | CONJUNCTION | PART=CONJUNCTION |

| WINDOW FOR DEFINING TEXT TYPE IDENTIFICATION RULES | REGISTER | CANCEL | HELP |
|---|---|---|---|

| NAME OF TEXT TYPE IDENTIFIER | NEWSPAPER ARTICLE | | |
|---|---|---|---|

| ATTRIBUTE ITEM NAME | ATTRIBUTE VALUE | WEIGHT | REGISTERED IDENTIFIER |
|---|---|---|---|
| NUMBER OF CHARACTERS | MORE THAN 300 LESS THAN 1500 | 0.3 | NEWSPAPER ARTICLE |
| NUMBER OF WORDS | MORE THAN 100 LESS THAN 750 | 0.3 | |
| NUMBER OF PARAGRAPHS | LESS THAN 5 | 0.5 | |
| NUMBER OF SENTENCES | LESS THAN 10 | 0.5 | |
| AVERAGE NUMBER OF SENTENCES IN A PARAGRAPH | | | |
| AVERAGE NUMBER OF WORDS IN A SENTENCE | MORE THAN 20 LESS THAN 50 | 0.6 | |
| AVERAGE NUMBER OF CHARACTERS IN A SENTENCE | | | |
| SPECIFIC CHARACTER STRING | | 0.8 | |
| OCCURRENCE FREQUENCY OF OPINION SENTENCE | LESS THAN 20 | 0.3 | |
| OCCURRENCE FREQUENCY OF IMPERATIVE SENTENCE | 0 | 0.3 | |
| OCCURRENCE FREQUENCY OF POLITE SENTENCE | 0 | 0.1 | |
| OCCURRENCE FREQUENCY OF PAST SENTENCE | MORE THAN 30 | | |
| OCCURRENCE FREQUENCY OF CONVERSATIONAL SENTENCE | | | |
| OCCURRENCE FREQUENCY OF COLLOQUIAL SENTENCE | 0 | 0.4 | |

FIG. 27

TEXT SUMMARIZING METHOD AND SYSTEM

BACKGROUND OF THE INVENTION

1. Field of the Invention

The present invention relates to a text summarizing method and system and particularly to a text summarizing method and system for summarizing a text in an electronic form including text information.

2. Description of the Prior Art

Recently, various types of text information in an electronic form have been used for communication. The preparation of computer networks has been promoted and text information can be obtained easily from a distant place. It is necessary to obtain necessary text information from these pieces of text information or summarize text information. For that purpose, if a system for automatically summarizing a text can be used so as to select text information or summarize text information, it is effective.

As a system for automatically summarizing a text, a summarizing support system described in Journal of Information Processing Society of Japan, Vol. 30, No. 10, a digest extracting system described in the Proceedings of 38th Annual Convention of Information Processing Society of Japan 6D-9, and an automatic text skimming system for Japanese explanatory texts described in the Proceedings of 46th Annual Convention of Information Processing Society of Japan 7B-11 have been reported.

When a human makes a summary of a text, it is considered that the method thereof varies with the constitution and field of the text. For example, the definition of an important portion is obviously different between a newspaper article, a specification of patent, and a technical paper. Even in newspaper articles, the summarizing method is obviously different between an article of judicial decision, an article of traffic accident, and an article of exchange.

The aforementioned systems all handle only texts belonging to a special constitution or field, so that when texts of other types are summarized, the precision comes into question. When a text is to be summarized in the state that there is a possibility that texts of various constitutions or fields are supplied, there is nothing that can be done about it.

SUMMARY OF THE INVENTION

An object of the present invention is to provide a text summarizing method and system for preventing the correctness of text summarization from dropping due to a difference in the constitution of text.

Another object of the present invention is to provide a text summarizing method and system for preventing the correctness of text summarization from dropping due to a difference in the field or content of text.

To accomplish these objects, the present invention is a system for summarizing an inputted text and is characterized in that the system stores a text analysis rule, a plurality of text type identification rules, a plurality of summarization method setting tables, and a summarization rule, extracts a corresponding text type identification rule on the basis of the text type identification rules and the text analysis rule, decides the text type of the extracted identification rule as a text type of the inputted text, selects a summarization method setting table corresponding to the determined text type from the summarization method setting tables, and summarizes the inputted text on the basis of the selected summarization method setting table and the summarization rule.

More concretely, in the text summarizing method having an input device, an output device, a processor, and a storage and preparing a summary by summarizing an inputted text in an electronic form, the present invention sets a word dictionary, grammar rules, data on text attributes comprising a plurality of attribute items, a text analysis rule, a plurality of text type identification rules, a plurality of text content/domain type identification rules, a plurality of summarization method setting tables, and a summarization rule in the storage and the processor analyses an inputted text in an electronic form on the basis of the word dictionary, the grammar rules, the data on text attributes, and the text analysis rule, generates a text analysis table comprising a word table and a text table, extracts a text type identification rule conforming to the content of the text analysis table mostly by referring to the plurality of text type identification rules, determines the text type of the extracted identification rule as a text type of the inputted text in an electronic form, extracts a text content/domain type identification rule conforming to the content of the text analysis table mostly by referring to the plurality of text content/domain type identification rules, determines the text content/domain type of the extracted identification rule as the text content/domain type of the inputted text in an electronic form, selects a summarization method setting table corresponding to a combination of the determined text type and text content/domain type from the plurality of summarization method setting tables, and summarizes the inputted text in an electronic form on the basis of the selected summarization method setting table and the summarization rule.

The processor informs of the text before summarization, the determined text type, the determined text content/domain type, and the selected text summarizing method by the output device according to an instruction of a user when the processor informs of the summarized text by the output device.

When the processor sets the text type identification rule in the storage, the processor displays the data on text attributes comprising a plurality of attribute items or the text type identification rule set in the storage already in the output device, generates or updates a text type identification rule from an identifier indicating the text type inputted from the input device, the attribute value of each attribute item, and the attribute items, and sets it in the storage.

When the processor sets the text content/domain type identification rule in the storage, the processor displays the data on text attributes comprising a plurality of attribute items and the data on text attributes comprising a plurality of attribute items for text content/domain type identification or the text content/domain type identification rule set in the storage already in the output device, generates or updates a text content/domain type identification rule from an identifier indicating the text content/domain type inputted from the input device, the attribute value of each attribute item, and the attribute items, and sets it in the storage.

The processor uses the text type or the text content/domain type which is inputted and designated from the input device in place of the determined text type or the determined text content/domain type.

A default text type and a default text content/domain type are preset in the storage, and a summarization method setting table corresponding to a combination of a text type and a text content/domain type including one or both of the default text type and the default text content/domain type is also preset, and when the processor judges that it cannot determine the text type as a result of determination of the type, the processor assumes the default text type as a text type, and when the processor judges that it cannot determine the text content/domain type as a result of determination of the type, the processor assumes the default text content/domain type as a text content/domain type.

A default text type and a default text content/domain type are preset in the storage, and a summarization method setting table corresponding to a combination of a text type and a text content/domain type including one or both of the default text type and the default text content/domain type is also preset, and when the processor is instructed to omit determination of the text type by the input device, the processor assumes the default text type as a text type, and when the processor is instructed to omit determination of the text content/domain type by the input device, the processor assumes the default text content/domain type as a text content/domain type.

The present invention having the aforementioned constitution has the function and operation indicated below.

Since a suitable text summarizing method can be selected according to the constitution, field, and content of a text by the aforementioned means, a highly precise summarizing result can be obtained.

Even when a set of texts comprising various types of texts is continuously summarized, the texts can be automatically summarized continuously without performing a manual operation such as classification.

The foregoing and other objects, advantages, manner of operation and novel features of the present invention will be understood from the following detailed description when read in connection with the accompanying drawings.

BRIEF DESCRIPTION OF THE DRAWINGS

FIG. 4 is a drawing showing an example of text attribute data.

FIG. 5 is a drawing showing a screen example when a text type identification rule is generated or updated.

FIG. 6 is a drawing showing another screen example when a text type identification rule is generated or updated.

FIG. 7 is a drawing showing an example of a text type identification rule.

FIG. 8 is a drawing showing a screen example when a text content/domain type identification rule is generated or updated.

FIG. 9 is a drawing showing an example of a text content/domain type identification rule.

FIG. 12 is a drawing showing an example of a summarization method setting table.

FIG. 14 is a drawing showing an example of a target text in an electronic form.

FIG. 15 is a drawing showing another example of a target text in an electronic form.

FIG. 16 is a drawing showing an example of a result of the morphological analysis.

FIG. 17 is a drawing showing another example of a result of the morphological analysis.

FIG. 18 is a drawing showing an example of a text analysis rule.

FIGS. 20a and 20B are drawings showing an example of a text analysis table.

FIGS. 21a and 21b are drawings showing another example of a text analysis table.

FIG. 24 is a drawing showing an example of a summarization rule.

FIG. 25 is a drawing showing an example of a summary.

FIG. 26 is a drawing showing another example of a summary.

FIG. 27 is a drawing showing another example of a text type identification rule.

DETAILED DESCRIPTION OF THE PREFERRED EMBODIMENTS

Embodiment

The embodiment of the present invention will be explained in detail hereunder with reference to the accompanying drawings.

Figure 1:
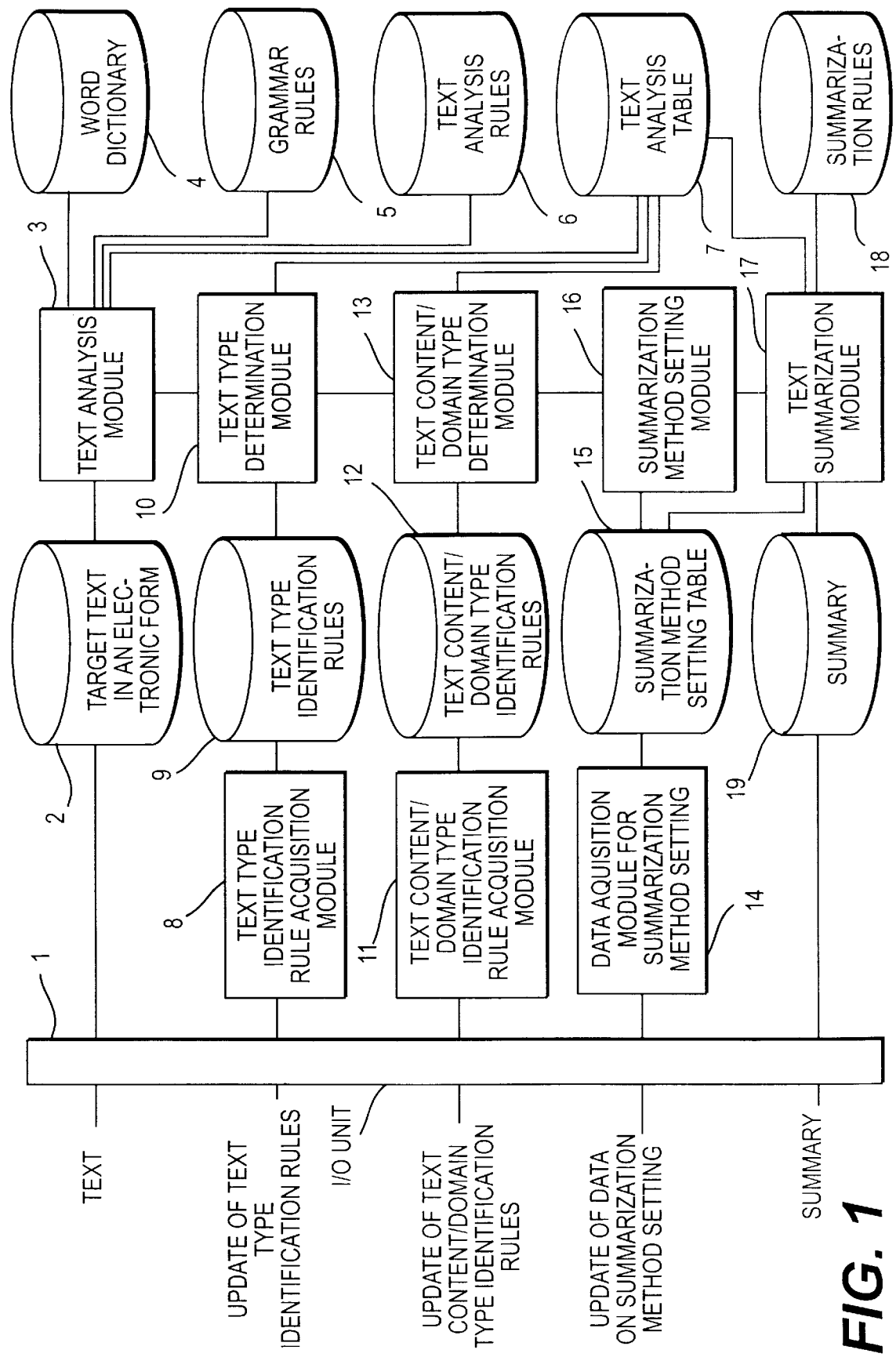
FIG. 1 is a block diagram showing the outline of this embodiment.

FIG. 1 is a block diagram showing the outline of this embodiment.

In this embodiment, it is assumed to prepare summaries of texts of various constitutions, fields, and contents. The summary of a text is effective in efficient understanding of the rough content of the text.

The system inputs a text via an I/O unit 1 and stores it as a target text in an electronic form 2. The text may be written in Japanese or other languages. A text analysis module 3 analyses the target text in an electronic form 2 using natural language processing technique. Namely, the text analysis module 3 divides the text into words using a word dictionary 4 and grammar rules 5 and acquires attribute information of the words. The text analysis module 3 analyses characteristics of the text by referring to text analysis rules 6. The text analysis module 3 stores these analytical results in a text analysis table 7.

A text type determination module 10 determines the text type with reference to the text analysis table 7. The text type hardly depends on the field and content of a text and is identified from a viewpoint of a formal structure of the text.

For example, a specification of patent and a newspaper article are quite different from each other in the form and structure thereof, so that it may be said that they are of different text types. There are various text types available in addition such as a letter, a technical paper, a novel, a request sentence, a telegram, and proceedings.

A human can identify these differences in a text even if he does not understand the contents of the text fully. When a human summarizes a text, it is considered that he changes the summarizing method depending on the type of the text.

A text type identification rule acquisition module 8 is a process for acquiring identification data for defining a certain text type from a user via the I/O unit 1. The text type identification rule acquisition module 8 stores the acquired identification data in text type identification rules 9.

A text content/domain type determination module 13 determines the content/domain type of the text with reference to the text type determined by the text analysis table 7 and the text type determination module 10.

The text content/domain type is identified on the basis of the field and content of the text. When the text type is a newspaper article, there is a text content/domain type available on the basis of the field such as politics, economy, sports, and culture and there is a text content/domain type available on the basis of the content such as an article of judicial decision, an article of accident, and an article of the yen rate.

When a human summarizes a text, it is considered that he changes the summarizing method depending on the content/domain type of the text.

A text content/domain type identification rule acquisition module 11 is a process for acquiring identification data for defining a certain text content/domain type belonging to a certain text type from a user via the I/O unit 1. The text content/domain type identification rule acquisition module 11 stores the acquired identification data in text content/domain type identification rules 12.

A summarization method setting module 16 extracts data with respect to the summarization method corresponding to a combination of the determined text type and text content/domain type from a summarization method setting table 15.

A data acquisition module for summarization method setting 14 is a process for acquiring the summarization method corresponding to a certain text content/domain type of a certain text type from a user via the I/O unit 1. The data acquisition module for summarization method setting 14 stores the acquired summarization method in the summarization method setting table 15.

A text summarization module 17 prepares a summary with reference to summarization rules 18 on the basis of the set summarization method and stores it as a summary 19. The summary 19 is reported to a user via the I/O unit 1.

FIG. 1 will be explained more in detail hereunder together with other drawings.

Figure 2:
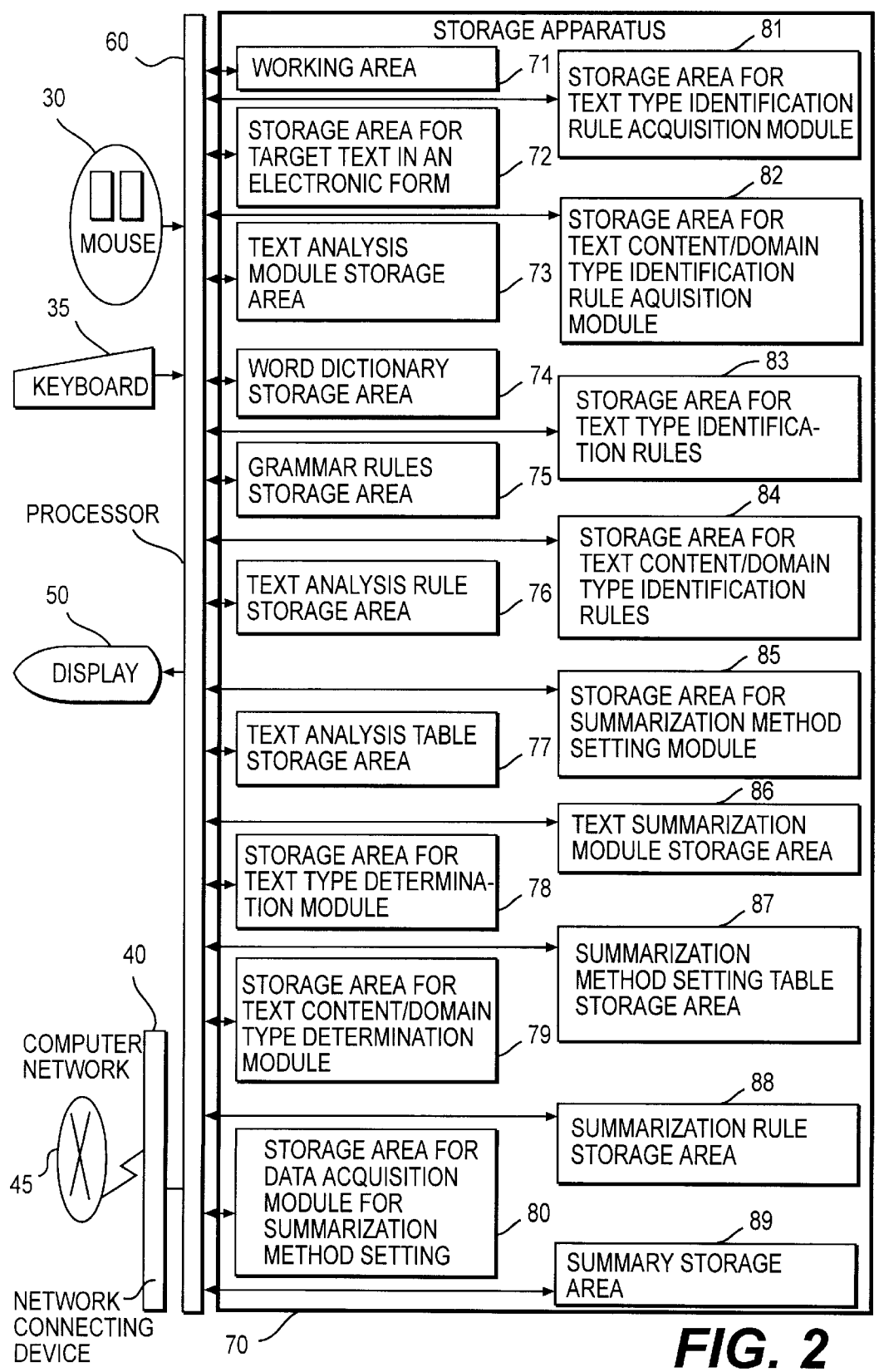
FIG. 2 is a block diagram showing the outline of the hardware constitution of this embodiment.

FIG. 2 is a block diagram showing the outline of the hardware constitution of this embodiment. The target text in an electronic form 2 shown in FIG. 1 can be acquired by inputting from a keyboard 35 or can be transferred from another computer connected with a computer network 45 such as a LAN and acquired via a network connecting device 40. Needless to say, it is possible to convert a text written on a sheet of paper into an electronic form using an image scanner and a character recognition device, or input a text by voice using a voice recognition device, or input a text with a pen.

A mouse 30 may be used for data input by a user in addition to the keyboard 35. A display 50 is used so as to report to a user. Needless to say, text information can be reported by voice via a voice output device.

A processor 60 loads a program and data from a storage 70 and performs the process.

The storage 70 is an area for storing a program and data.

Namely, the storage 70 comprises a working area 71 for storing temporary data at the time of execution of the process, a storage area for a target text in an electronic form 72, a text analysis module storage area 73, a word dictionary storage area 74, a grammar rules storage area 75, a text analysis rule storage area 76, a text analysis table storage area 77, a storage area for a text type determination module 78, a storage area for a text content/domain type determination module 79, a storage area for a data acquisition module for summarization method setting 80, a storage area for a text type identification rule acquisition module 81, a storage area for a text content/domain type identification rule acquisition module 82, a storage area for text type identification rules 83, a storage area for text content/domain type identification rules 84, a storage area for a summarization method setting module 85, a storage area for a text summarization module 86, a summarization method setting table storage area 87, a summarization rule storage area 88, and a summary storage area 89.

Figure 3:
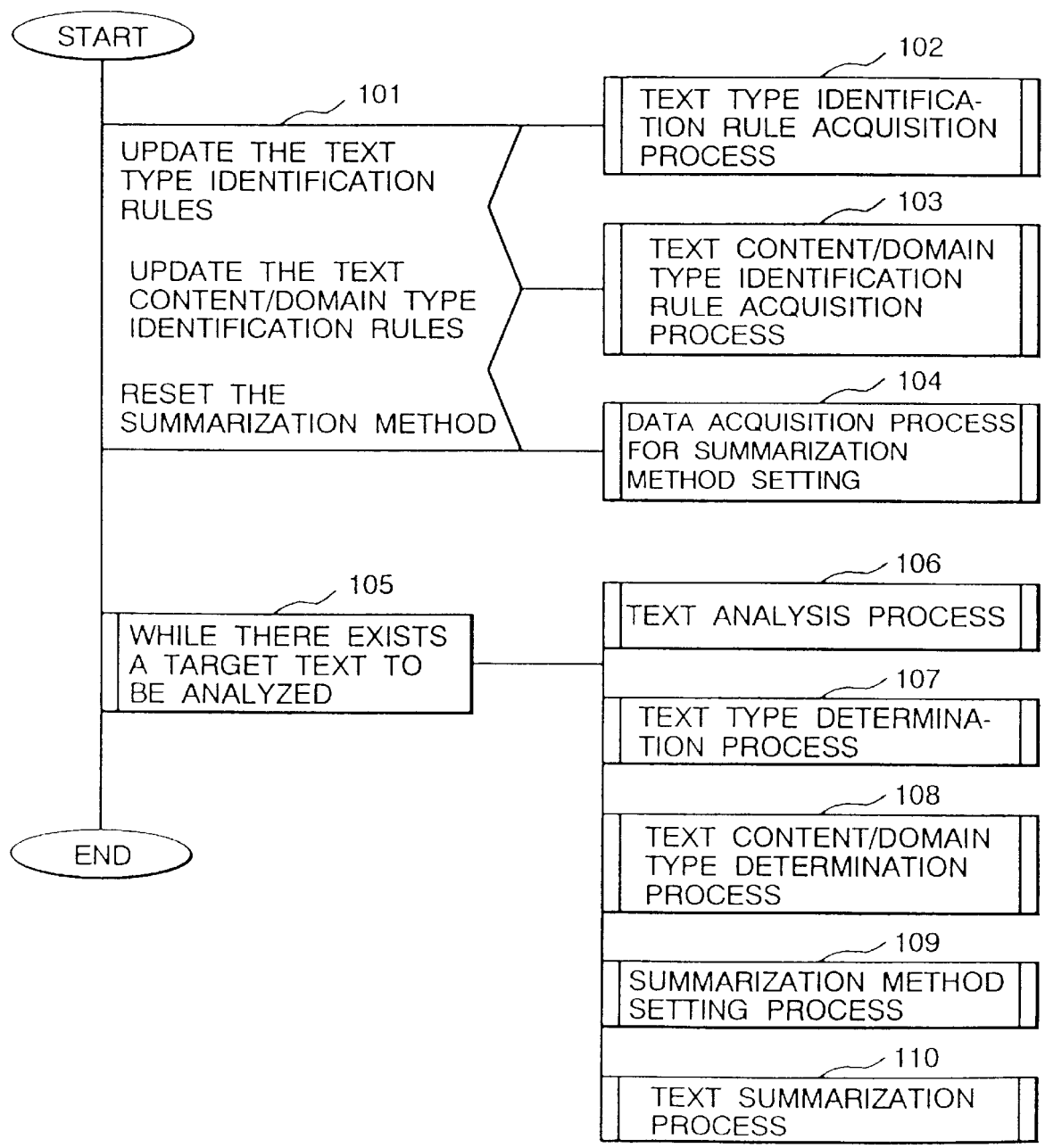
FIG. 3 is a PAD diagram showing the processing flow of this embodiment.

FIG. 3 is a drawing showing the outline of the processing flow of this embodiment.

If the text type and the identification rule thereof, the text content/domain type and the identification rule thereof, and the text summarizing method corresponding to them are not defined at Step 101 or the definition information thereof is to be updated, the processor 60 acquires definition data from a user via the I/O unit 1 at Step 102 to Step 104 according to the information to be defined.

In this embodiment, as described later, acquisition of the definition data from the user is realized by an interface (GUI) using a graphical screen. Next, while the target text in an electronic form 2 exists, the processor 10 executes the following process. In this case, for a text to be summarized, a user may designate the text file name or a file existing in the directory may be summarized.

Firstly, the text analysis process (Step 106) analyses the target text in an electronic form 2 using the natural language processing technique. Namely, the text analysis process divides the text into words using the word dictionary 4 and the grammar rules 5 and acquires attribute information of the words. The text analysis process also analyses characteristics of the text by referring to the text analysis rules 6.

Next, the text type determination process (Step 107) determines the text type.

Next, the text content/domain type determination process (Step 108) determines the text content/domain type. Next, the summarization method setting process (Step 109) sets a parameter value for regulating the text summarizing method.

Next, the text summarization process (Step 110) prepares a summary.

FIG. 4 is a drawing showing an example of text attribute data in this embodiment.

Figure 13:
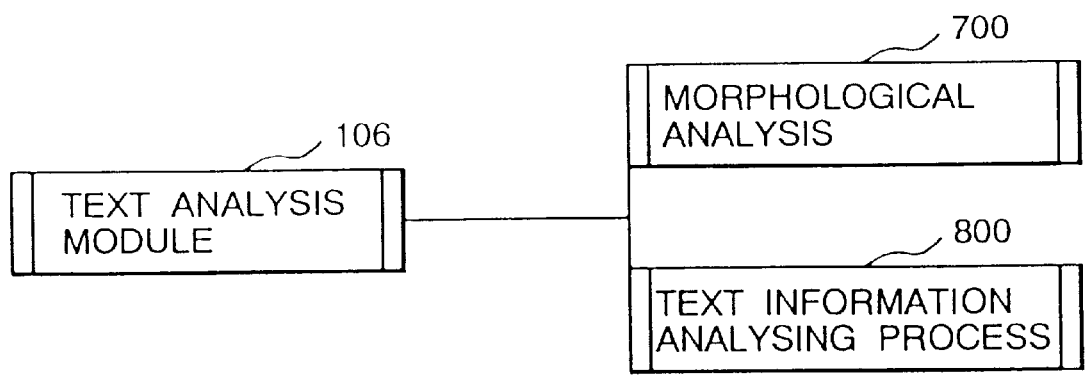
FIG. 13 is a PAD diagram showing the text analysis process.

Text attribute data is a set of text attributes necessary for determining the text type and text content/domain type and the attribute value thereof is analysed by the text analysis process 106 as shown in FIG. 13.

In FIG. 4, attribute items include "number of characters" constituting a text, "number of words", "number of paragraphs", "number of sentences", "average number of sentences in a paragraph", "average number of words in a sentence", "specific character string", and "occurrence frequencies" of opinion sentence, imperative sentence, polite sentence, past sentence describing a past thing, conversational sentence, and colloquial sentence including colloquial expression. These attribute data are just examples and attribute data other than them are acceptable.

By comparing the values of these attributes calculated by the text analysis process 106 with the text type identification rules 9 and the text content/domain type identification rules 12, the text type and text content/domain type are decided uniquely.

FIG. 5 shows a screen example when a text type identification rule is defined or updated.

When a user selects "update the text type identification rules" at Step 101 shown in FIG. 3, the text type identification rule acquisition process (Step 102) displays this screen 300 on the display.

The screen 300 comprises an area 301 for inputting the name of text type identifier, an area 302 for displaying the item of each attribute of text attribute data, an area 303 for inputting corresponding attribute values, an area 304 for displaying registered identifiers, a button 305 for registering an inputted status as a text type identification rule, a button 306 for canceling update and ending the process, and a help button 307.

A user inputs the name of an identifier and the value of each attribute from the keyboard. When the register button 305 is pressed, the program reads the identifier and attribute values inputted at that point of time and stores them in the text type identification rules 9. If the same identifier is registered already, the program may output a warning message. As to a method of storing data inputted on the screen in the storage 70 in correspondence to each other by a user, there are a lot of embodiments disclosed, so that it will not be referred to here so much.

"Specific character string" shown in FIG. 5 is a character string such as "Title of the Invention" or "What is Claimed is" which appears generally, for example, when the text type identifier is assumed as a specification of patent.

FIG. 6 shows another screen example when a text type identification rule is defined or updated.

In the drawing, a text type of "request message" is defined and it is quite different in the definition of attribute value from "newspaper article" shown in FIG. 5.

FIG. 7 is a drawing showing an example of the constitution of the text type identification rules 9.

One text type identification rule 9 comprises seven portions of a text type identifier 200, an attribute item code 201 for identifying attributes, an attribute item name 202, a type of attribute value 203, a maximum attribute value 204, a minimum attribute value 205, and a character string for storing information of character string 206 and text type identification rules of the number of text types are generated.

The text type identifier 200 and values stored in the maximum value 204, the minimum value 205, and the character string 206 are acquired by the text type identification rule acquisition process 102 (FIG. 5 or 6).

The program recognizes values immediately before "not less than" and "more than" of the character string as the minimum value 205 and recognizes values immediately before "not more than" and "less than" of the character string as the maximum value 206. The type of attribute value 203 which is a character string inputted in an area of character string is stored in the character string 206.

FIG. 8 shows a screen example when the text content/domain type identification rule 12 is defined or updated.

When a user selects "update the text content/domain type identification rules" at Step 101 shown in FIG. 3, the text content/domain type identification rule acquisition process (Step 103) displays this screen 400 on the display.

The screen 400 comprises an area 401 for inputting the name of text type identifier, an area 402 for inputting the name of text content/domain type identifier, an area 403 for displaying the item of each attribute of text attribute data, an area 404 for inputting corresponding attribute values, an area 408 for displaying registered identifiers, a button 409 for registering an inputted status as a text type identification rule, a button 410 for canceling update and ending the process, and a help button 411.

Although the screen 400 is similar to the screen shown in FIG. 5, there are some differences between them. They are that the screen 400 has areas for inputting the identifiers of both the text type and text content/domain type and attribute items (405 to 407) existing only in the screen 400. Numerals 405 to 407 indicate attribute items of text attribute data for text content/domain type identification and they are attribute items for identifying the text content/domain type.

Identification of the field and content of a text cannot be executed only by formal information of the text, so that the present invention analyses and identifies the occurrence status of a specific word.

An attribute item of "word that always occurs 405" is a set of words always appearing in a text of the field and content. An attribute item of "word of frequent occurrence 406" is a set of words at least one type of which always appears in a text of the field and content. An attribute item of "summarization keyword 407" is a set of keywords used to decide whether it is an important portion or not in the text summarization process 17.

A user inputs the names of two kinds of identifiers and the value of each attribute from the keyboard. When the register button 409 is pressed, the program reads the two kinds of identifiers and attribute values inputted at that point of time and stores them in the text content/domain type identification rules 12.

If the same identifiers as the two kinds of identifiers are registered already, the program may output a warning message. As to a method of storing data inputted on the screen in the storage 70 in correspondence to each other by a user, there are a lot of embodiments disclosed, so that it will not be referred to here so much.

FIG. 9 is a drawing showing an example of the constitution of the text content/domain type identification rules 12.

The constitution is the same as that of the text type identification rules 9 shown in FIG. 7 basically. However, the constitution is different in that the text content/domain type identification rules 12 have an area 501 for storing text content/domain type identifiers and an area for storing data corresponding to the attribute items 405 to 407 shown in FIG. 8 as an attribute item 201.

Figure 10:
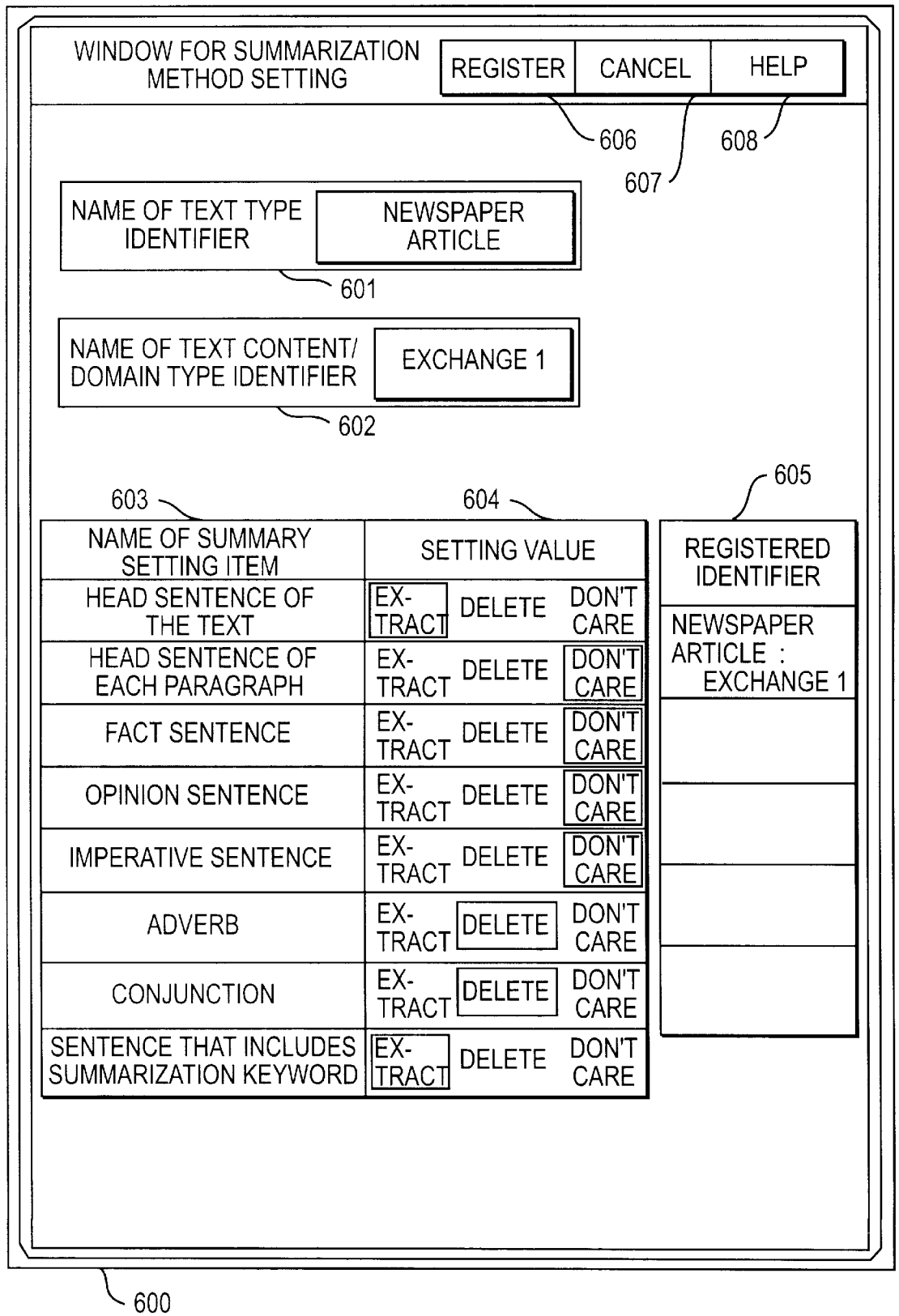
FIG. 10 is a drawing showing a screen example when a summarization method setting table is generated or updated.

FIG. 10 shows a screen example when the summarization method setting table 15 is defined or updated.

When a user selects "reset the text summarization method" at Step 101 shown in FIG. 3, the data acquisition process for summarization method setting (Step 104) displays this screen 600 on the display.

The screen 600 comprises an area 601 for inputting the name of text type identifier, an area 602 for inputting the name of text content/domain type identifier, an area 603 for displaying the item of summarization setting, an area 604 for inputting corresponding setting values, an area 605 for displaying registered identifiers, a button 606 for registering an inputted status in the summarization method setting table, a button 607 for canceling update and ending the process, and a help button 608.

In the text summarization (summarization) in this embodiment, as shown in FIG. 10, a plurality of parameters for regulating the summarization method are prepared and what portion of a text is to be regarded as important and what portion is to be regarded as unnecessary can be defined freely by setting the parameter values.

This method is described in Japanese Patent Application Number 5-119541 and the Proceedings of the Tenth Symposium on Human Interface of the Society of Instrument and Control Engineers.

In this embodiment, 8 kinds of summary setting items 603 are defined. Namely, they are "head sentence of the text", "head sentence of each paragraph", "fact sentence", "opinion sentence", "imperative sentence", "adverb", "conjunction", and "sentence that includes summarization keyword".

In this case, "sentence that includes summarization keyword" indicates a text including at least one kind of the summarization keyword 407 defined on the screen 400 (FIG. 8) in the text content/domain type identification rule acquisition process 103. The setting items 603 may include "opening paragraph sentence" and "summary length" as described in the aforementioned paper in addition to the above items.

In this embodiment, the summarization rules 18 are prepared as rules for deciding whether a certain portion of a text satisfies these setting items or not and a portion satisfying each setting item is extracted by referring to these rules (described later).

As a setting value 604 of each setting item 603, three values of "extract", "delete", and "don't care" are defined in this embodiment. "Extract" is an instruction of extraction of a portion satisfying the setting item as a summary, and "deletion" is an instruction of deletion, and "don't care" is an instruction that the parameter may be ignored. A user can select one of the setting values.

A user can omit at least one of the text type identifiers and text content/domain type identifiers. As described later, in the text type determination process 10 or the text content/domain type determination process 13, there is a case that the text type or the text content/domain type cannot be determined. Therefore, it is necessary to also set a summarization method responding to a case that the type cannot be determined.

Figure 11:
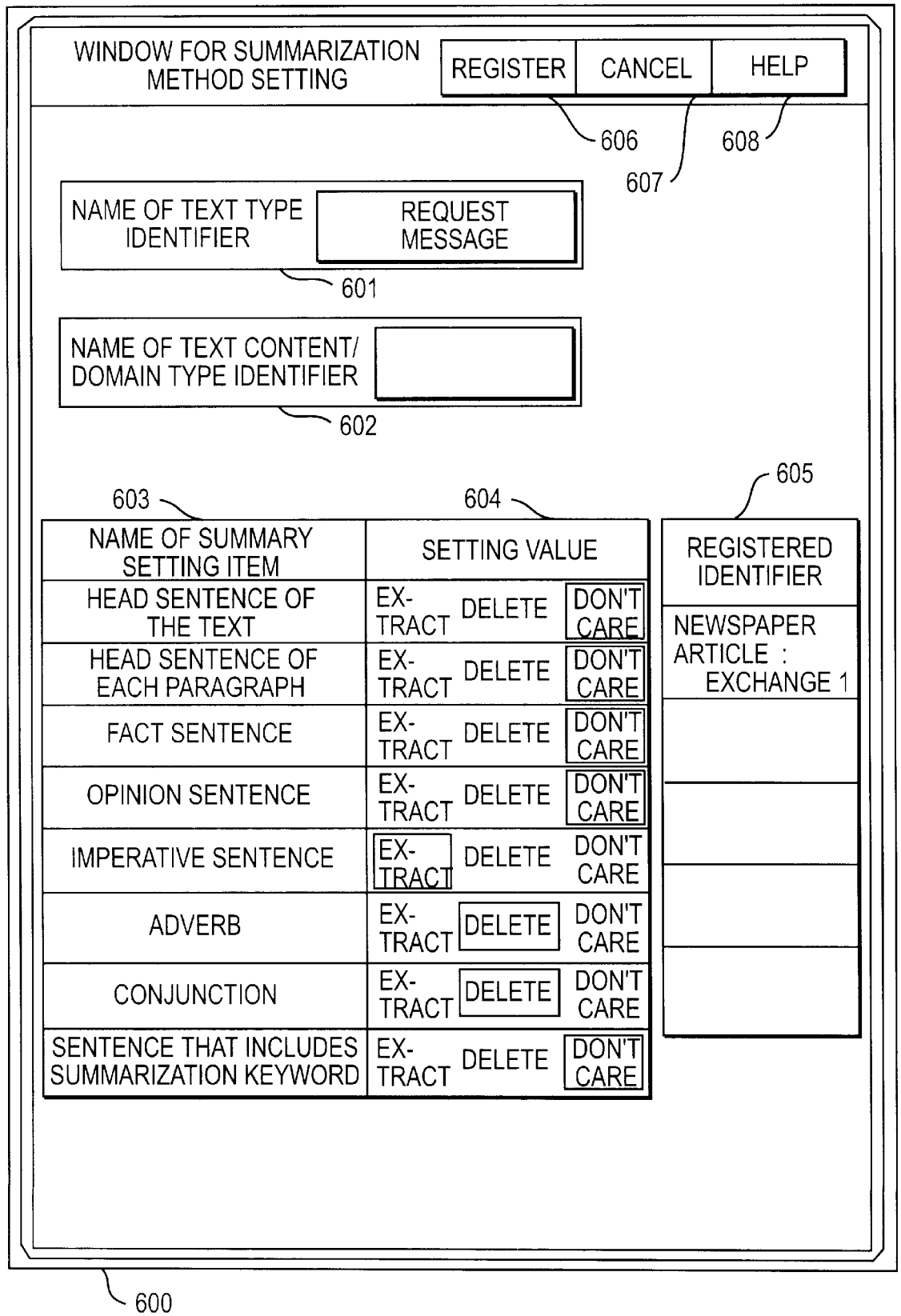
FIG. 11 is a drawing showing another screen example when a summarization method setting table is generated or updated.

FIG. 11 shows such an example. In FIG. 11, the name of text type identifier 601 is defined but the name of text content/domain type identifier 602 is not defined. Therefore, the setting value 604 shown in FIG. 11 is regarded as a summarization method of "request message" in which the text content/domain type cannot be determined.

A user inputs the names of two kinds of identifiers and the setting value of each setting item from the mouse or keyboard. When the register button 606 is pressed, the program reads the two kinds of identifiers and setting values inputted at that point of time and stores them in the summarization method setting table 15.

If the same identifiers as the two kinds of identifiers are registered already, the program may output a warning message. As to a method of storing data inputted on the screen in the storage 70 in correspondence to each other by a user, there are a lot of embodiments disclosed, so that it will not be referred to here so much.

FIG. 12 is a drawing showing an example of the constitution of the summarization method setting table.

Three kinds of summarization methods are described here. Namely, they are a case that the text type is newspaper article and the text content/domain type is exchange 1, a case that the text type is request message and the text content/domain type is not defined (default), and a case that both are not defined. Among the numerical values of the setting values 852, a value of 0 corresponds to "extract" shown in FIG. 10, a value of 1 corresponds to "delete" shown in FIG. 10, and a value of 2 corresponds to "don't care" shown in FIG. 10.

In FIG. 13 and the subsequent drawings, the processes and flow of data from input of the target text in an electronic form 2 to storing of the summary 19 are described.

FIG. 13 is a PAD diagram showing the outline of the text analysis process 106 executed by the text analysis module 3.

Firstly, a morphological analysis 700 divides the target text in an electronic form 2 into words by referring to the word dictionary 4 and the grammar rules 5 and acquires the part of speech information of each word from the word dictionary 4.

As to the morphological analysis 700, there are a lot of prior arts such as the Proceedings of 44th Annual Convention of Information Processing Society of Japan, Lecture papers 4P-7, so that it will not be referred to here so much.

Next, a text information analysing process 800 analyses the text attributes described in FIG. 4 by referring to the morphological analysis result and the text analysis rules 6.

Figures 14, 15:
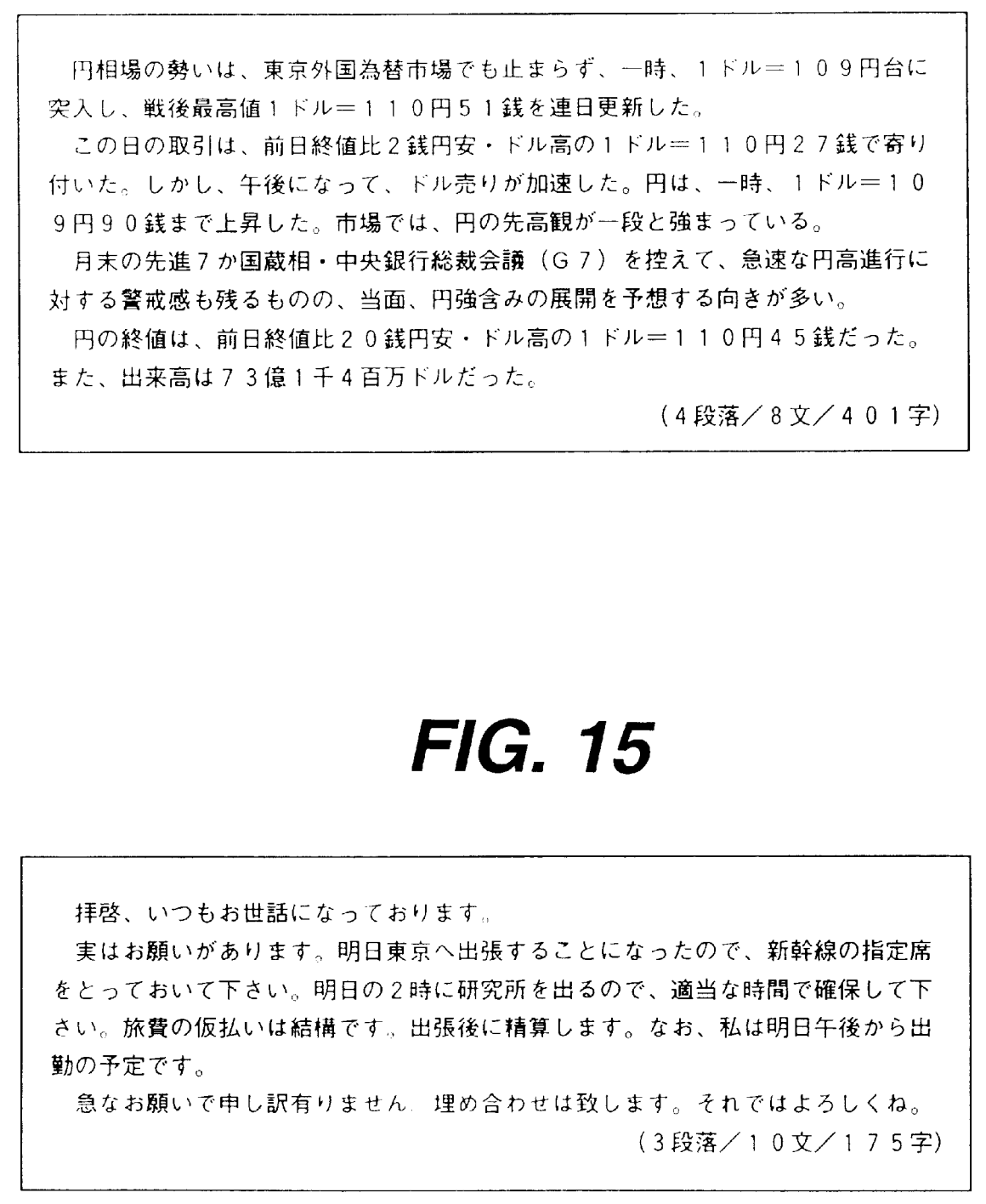

FIG. 14 is a drawing showing an example of the target text in an electronic form 2. This is a newspaper article and a text with respect to exchange and is translated into English as follows:

"The power of the yen rate does not stop also in the Tokyo foreign exchange market, and one dollar reaches the level of 109 yen temporarily, and one dollar=110 yen and 51 sen which is the highest value since the war is updated every day.

The today's transaction was opened at one dollar=110 yen and 27 sen which is 2 sen cheaper and higher dollar compared with the closing price on the preceding day. In the afternoon, dollar selling was accelerated. The yen increased up to one dollar=109 yen and 90 sen temporarily. In the market, the view of higher quotations of yen for future months is increased much the more.

With the conference (G7) of the Ministers of Finance and governors of the central bank in the seven advanced countries just before them, although the feeling of caution over rapid progress of the exchange rate in favor of the yen remains, there are a lot of persons who expect development of a strong feeling of the yen.

The closing price of yen was one dollar=110 yen and 45 sen which is 20 sen cheaper and higher dollar compared with the closing price on the preceding day. The volume was 7 billion and 314 million dollars.

(4 paragraphs, 8 sentences, 401 characters)"

FIG. 15 is a drawing showing another example of the target text in an electronic form 2. This is something like electronic mail and a text with respect to a request of arrangement of business trip and is translated into English as follows:

"Dear Mr. - - - ,

There is something I want to ask you. I am ordered to go to Tokyo on business tomorrow, so that please get me a reserved seat of Shinkansen. Since I will leave the laboratory at 2 o'clock tomorrow, get a reserved ticket at a suitable time. Temporary payment of traveling expenses is not necessary. The expenses will be requested after return from business trip. I intend to go to work tomorrow afternoon.

I am sorry to trouble you for a sudden request. I intend to make up for it. Thank you.

(3 paragraphs, 10 sentences, 175 characters)"

Figures 16, 17:
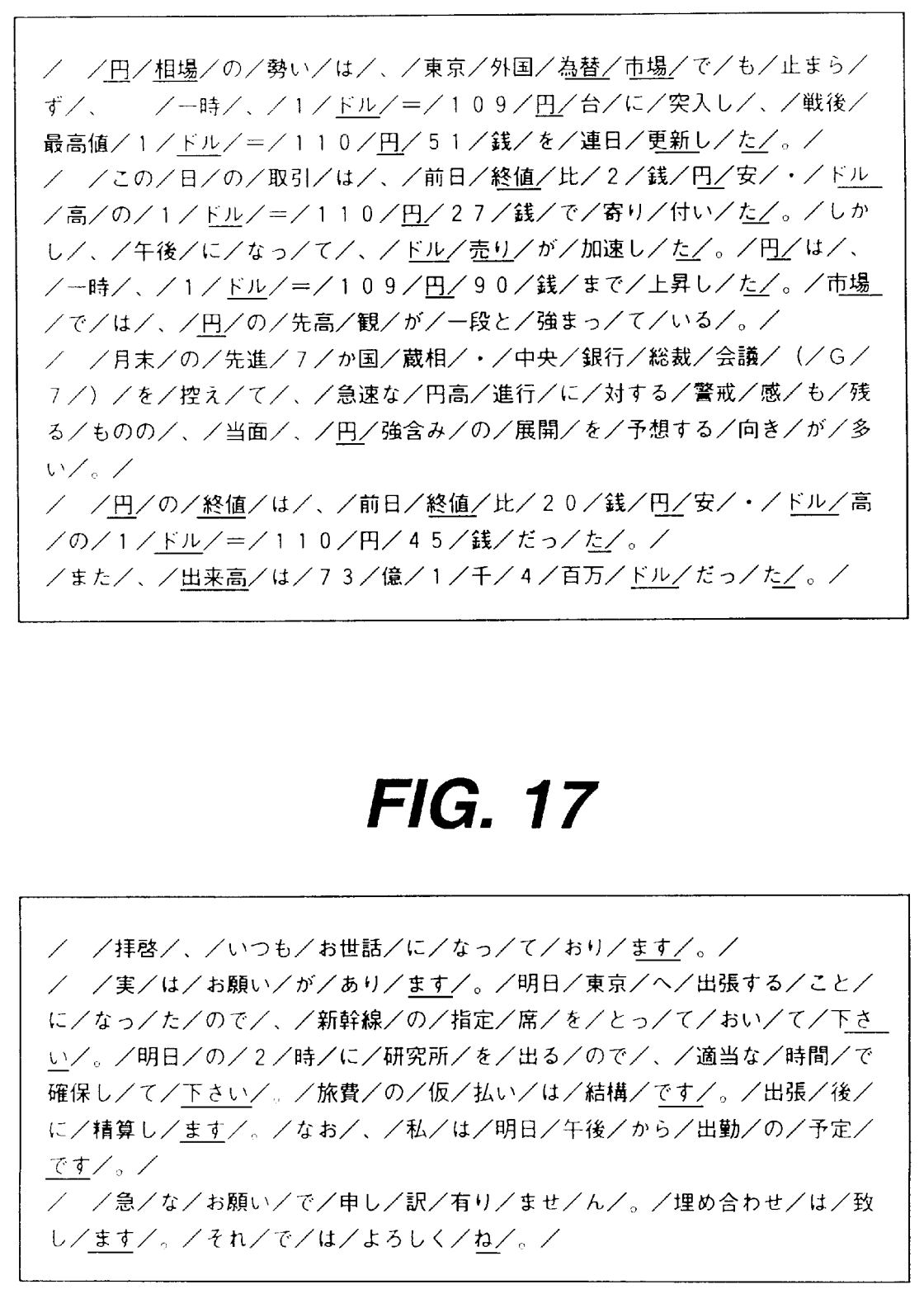

FIG. 16 shows a result when the morphological analysis 700 is made for the text shown in FIG. 14. Each "slash" indicates a boundary of a word. Words which will be used illustratively for explanation hereafter are underlined.

FIG. 17 shows a result when the morphological analysis 700 is made for the text shown in FIG. 15. Words which will be used illustratively for explanation hereafter are underlined.

The result of the morphological analysis 700 is stored in the word table in the text analysis table 7 shown in FIG. 20(a). The word table comprises, as shown in FIG. 20(a), a paragraph No. 1001, a sentence No. 1002, a word No. 1003, words 1004, and a part of speech 1005.

FIG. 18 is a drawing showing an example of the constitution of the text analysis rules 6 used by the text information analysing process 800 executed immediately after the morphological analysis 700.

The text information analysing process 800 analyses the text attributes described in FIG. 4 and in the text analysis rules 6, rules for identifying the opinion sentence, imperative sentence, and polite sentence shown in FIG. 4 are defined beforehand. Each rule comprises a code 201 for identifying an attribute, an attribute name 202, and a text analysis rule 900. The text analysis rule 900 describes a location where a word appears or a location where a word of a part of speech appears.

In this case, character strings "word" and "last" are used to limit an occurrence location of a word, and "word" indicates an optional location of the text, and "last" indicates the end of the text (the punctuation mark is excluded). A character string "strs" does not need to be a word and indicates that it is desirable that the character string is included in the text.

Therefore, the rule "word=""" ("beki" means "should", "ought to", etc.) with respect to an attribute of occurrence frequency of opinion sentence describes a rule of "a sentence including a word "beki" is regarded as an opinion sentence" and the rule "strs=""" ("to omou" means "- - - think(s)", etc.) describes a rule of "a sentence including a character string "" is regarded as an opinion sentence". Furthermore, the rule "last=" ("kudasai" means "please - - - ", etc.) with respect to occurrence frequency of imperative sentence describes a rule of "a sentence which ends with " " is regarded as an imperative sentence".

The text information analysing process 800 calculates the value of each attribute by referring to the morphological analysis result and the text analysis rule 6 and analyses the characteristics of the text.

Figure 19:
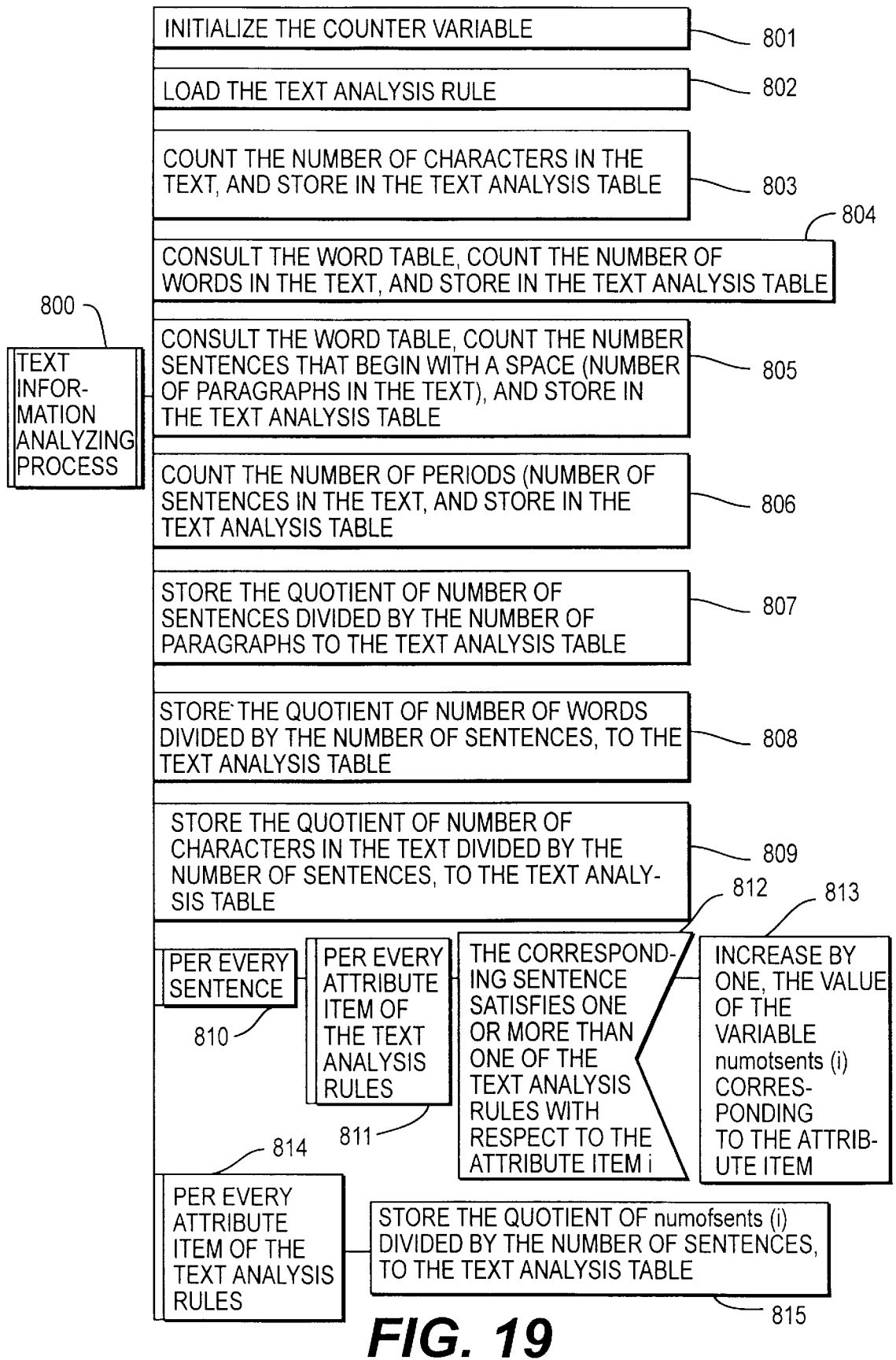
FIG. 19 is a PAD diagram showing the flow of the text information analysing process.

FIG. 19 is a PAD diagram showing the processing of the text information analysing process 800.

Firstly, the text information analysing process 800 initializes the counter variable (Step 801) and loads the text analysis rule 6 (Step 802). Next, the text information analysing process counts the number of characters in the text and stores the value in the attribute value 950 of A01 of the attribute item code 201 of the text table of the text analysis table 7 shown in FIG. 20(b) (Step 803).

Next, the text information analysing process counts the number of characters in the text by referring to the word table (FIG. 20(a)) of the text analysis table 7 and stores the value in the attribute value of A02 of the attribute item code of the text table of the text analysis table 7 (Step 804).

The text information analysing process also counts the number of sentences that begin with a space, that is, the number of paragraphs in the text and stores the value in the attribute value of A03 of the attribute item code of the text table of the text analysis table 7 (Step 805).

The text information analysing process also counts the number of sentences in the text and stores the value in the attribute value of A04 of the attribute item code of the text table of the text analysis table 7 (Step 806).

Furthermore, the text information analysing process calculates the quotient of the number of sentences divided by the number of paragraphs, that is, the average number of sentences per paragraph and stores the value in the attribute value of A05 of the attribute item code of the text table of the text analysis table 7 (Step 807).

Furthermore, the text information analysing process calculates the quotient of the number of words in the text divided by the number of sentences in the text, that is, the average number of words per sentence and stores the value in the attribute value of A06 of the attribute item code of the text table of the text analysis table 7 (Step 808).

Furthermore, the text information analysing process calculates the quotient of the number of characters in the text divided by the number of sentences in the text, that is, the average number of characters per sentence and stores the value in the attribute value of A07 of the attribute item code of the text table of the text analysis table 7 (Step 809).

Next, the text information analysing process executes the following for every sentence (Step 810). The text information analysing process executes the following for every attribute item 201 of the sentence analysis rules 6 (Step 811). The text information analysing process discriminates whether the corresponding sentence satisfies at least one of the text analysis rules 900 with respect to the corresponding attribute item i or not (Step 812). When it does, the text information analysing process increases the value of the counter variable numofsents[i] corresponding to the attribute item i by one (Step 813).

After Step 810, the text information analysing process executes the following for every attribute item of the text analysis rules 6 (Step 814). The text information analysing process calculates the quotient of the value of the variable numofsents[i] corresponding to the corresponding attribute item divided by the number of sentences and stores the value in the text table of the text analysis table 7 (Step 815).

The attribute value of the text table of the text analysis table 7 shown in FIG. 20(b) can be obtained by the text information analysing process 800.

FIG. 20 is a drawing showing(a) a part of the word table of the text analysis table 7 which is obtained from the text shown in FIG. 14 by the text analysis process and (b) the text table. As shown in FIG. 18, a sentence ending with a word of "" ("ta" means "- - - ed" of past sentence) is handled as a past sentence and in the text shown in FIG. 14, there are 6 such sentences among the 8 sentences (75%). Therefore, a numerical value of 75 is stored in the occurrence frequency (A12) of past sentence shown in FIG. 20(b). The same may be said with the following.

FIG. 21 is a drawing showing (a) a part of the word table of the text analysis table 7 which is obtained from the text shown in FIG. 15 by the text analysis process and (b) the text table.

Figure 22:
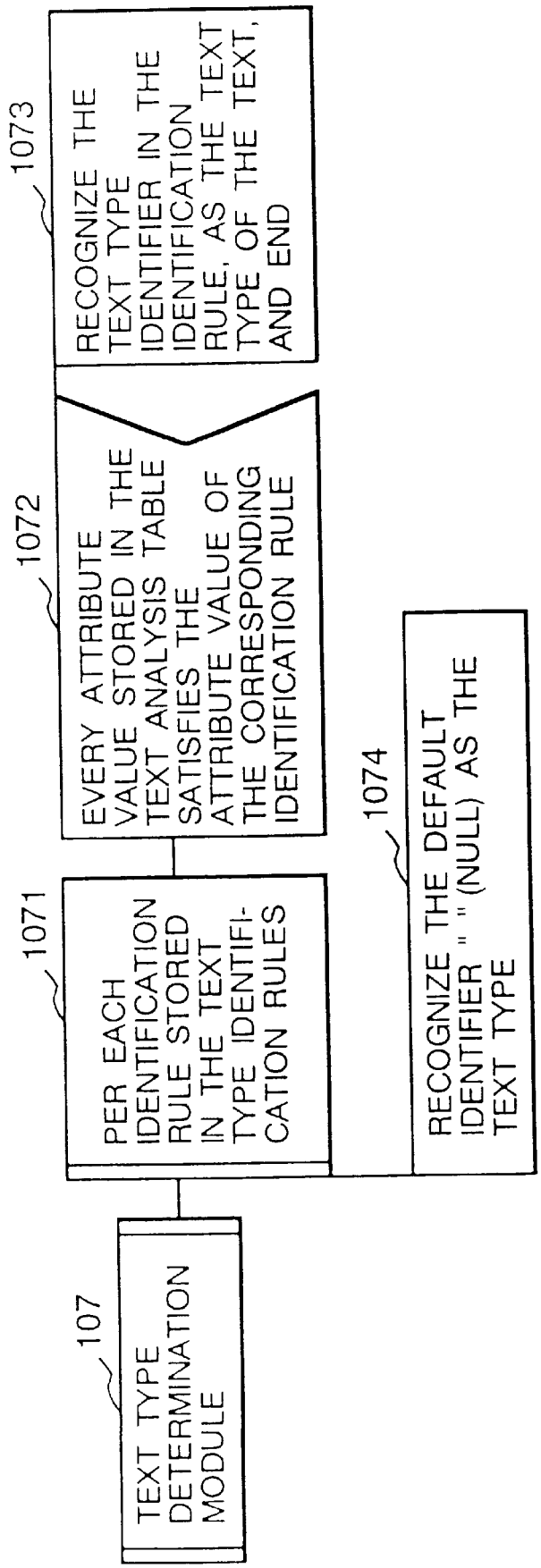
FIG. 22 is a PAD diagram showing the flow of the text type determination process.

FIG. 22 is a PAD diagram showing the processing of the text type determination process 107.

Firstly, the text type determination process 107 executes the following process for each identification rule stored in the text type identification rules 9 (Step 1071). The text type determination process discriminates whether every attribute value stored in the text table of the text analysis table 7 satisfies the attribute value of the corresponding identification rule or not (Step 1072). When it does, the text type determination process 107 recognizes the text type identifier in the corresponding identification rule as the text type of the corresponding text and ends the processing (Step 1073).

The text type determination process moves to Step 1074 after Step 1071 only when the text type cannot be determined. Therefore, at Step 1074, the text type determination process recognizes the text type as a default value. In this case, the identifier thereof is assumed as " " (NULL).

When the text type determination process 107 compares the text table shown in FIG. 20 with the text type identification rules shown in FIGS. 5 and 6, the identification rules of the newspaper article shown in FIG. 5 all satisfy the text table shown in FIG. 20, so that the text shown in FIG. 14 is recognized as that the text type is "newspaper article".

When the text type determination process also compares the text table shown in FIG. 21 with the text type identification rules shown in FIGS. 5 and 6, the identification rules of the newspaper article shown in FIG. 5 are not suitable because the number of characters A01 in the text is not satisfied. On the other hand, since the identification rules of the request message shown in FIG. 6 all satisfy the text table shown in FIG. 21, the text shown in FIG. 15 is recognized as that the text type is "request message".

A text type inputted from the input device such as the keyboard by a user may be used in place of the text type determined by the text type determination process.

Figure 23:
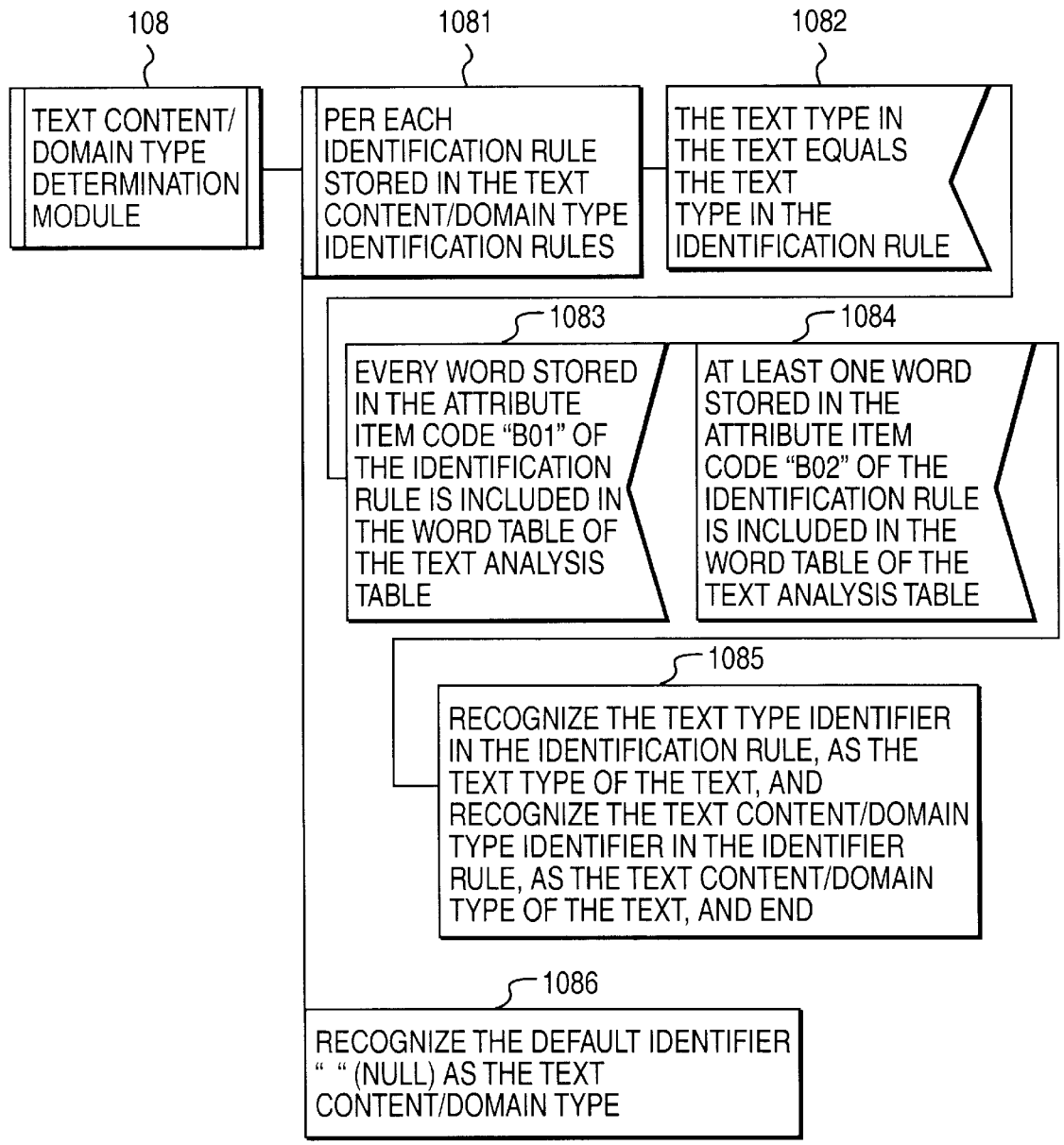
FIG. 23 is a PAD diagram showing the flow of the text content/domain type determination process.

FIG. 23 is a PAD diagram showing the processing of the text content/domain type determination process 108.

Firstly, the text content/domain type determination process 108 executes the following process for each identification rule stored in the text content/domain type identification rules 12 (Step 1081).

The text content/domain type determination process discriminates whether the text type identifier of the corresponding text equals the text type identifier in the corresponding identification rule (Step 1082). When it does, the text content/domain type determination process further discriminates whether the attribute item code B01 of the corresponding identification rule, that is, all the words defined and stored as "word that always occurs" exist in the words of the text analysis table at least once or not (Step 1083). When they occur, the text content/domain type determination process further discriminates whether the attribute item code B02 of the corresponding identification rule, that is, at least one of the words defined and stored as "word of frequent occurrence" exists in the words of the word table of the text analysis table at least once or not (Step 1084). When it occurs, the text content/domain type determination process 108 recognizes the text type identifier in the corresponding identification rule as the text type of the corresponding text, recognizes the text content/domain type identifier in the corresponding identification rule as the text content/domain type of the corresponding text, and ends the processing (Step 1085).

The text content/domain type determination process moves to Step 1086 after Step 1081 only when the text content/domain type cannot be determined. Therefore, at Step 1086, the text content/domain type determination process recognizes the text content/domain type as a default value. In this case, the identifier thereof is assumed as " " (NULL).

When the text content/domain type determination process 108 compares the text (having the morphological analysis result shown FIG. 16 and the text analysis table shown in FIG. 20) shown in FIG. 14 with the text content/domain type identification rules shown in FIG. 9, in the identification rules of "exchange 1" of the newspaper article shown in FIG. 9, FIG. 16 shows that three kinds of words of "" ("kawase" means "exchange"), "" ("en" means "yen"), and "" ("doru" means "dollars") which are "word that always occurs" exist in the text shown in FIG. 14 and furthermore, "" and "" among "" ("shijo" means "market"), "" ("soba" means "quotation"), "" ("uri" means "sell"), and "" ("kai" means "buy") which are "word of frequent occurrence" exist. Therefore, all the identification rules shown in FIG. 8 satisfy the text table shown in FIG. 20, so that it is recognized that the text type is "newspaper article" and the text content/domain type is "exchange 1".

When the text content/domain type determination process 108 also compares the text (having the morphological analysis result shown FIG. 17 and the text analysis table shown in FIG. 21) shown in FIG. 15 with the text content/domain type identification rules shown in FIG. 9, the text shown in FIG. 15 has "request message" as a text type, so that the text type is different from the text type "newspaper article" in the identification rule shown in FIG. 9. Therefore, the text shown in FIG. 15 is recognized as that the text type is "request message" and the text content/domain type is the default text content/domain type. In this case, the identifier thereof is assumed as " " (NULL).

A text content/domain type inputted from the input device such as the keyboard by a user may be used in place of the text content/domain type determined by the text content/domain type determination process.

When the text type and the text content/domain type are determined like this, a text summarizing method is uniquely determined.

When the text type and the text content/domain type are combined, there are a case that specific identifiers are determined for both, a case that one of the identifiers is " " (NULL) (namely, default value), and a case that both identifiers are " " (NULL) (namely, default value).

The summarization method setting process 109 sets the value 604 of the summary setting item 603 (FIG. 10) for summarizing a text by referring to the summarization method setting table 15. For example, since the text type of the text shown in FIG. 14 is "newspaper article" and the text content/domain type is "exchange 1", from the summarization method setting table 15 when the text type shown in FIG. 12 is "newspaper" and the text content/domain type is "exchange 1", a setting of " "head sentence of the text" is extracted, and "sentence that includes summarization keyword" is extracted, and "adverb" is deleted, and "conjunction" is deleted" is obtained. In this case, "summarization keyword" is "" ("owarine" means "closing price") or "" ("dekidaka" means "volume") from FIG. 9.

On the other hand, since the text type of the text shown in FIG. 15 is "request message" and the text content/domain type is " " (default value), from the summarization method setting table 15 when the text type shown in FIG. 12 is "request message" and the text content/domain type is " " (default value), a setting of " "imperative sentence" is extracted, and "adverb" is deleted, and "conjunction" is deleted" is obtained and the summarization method is different from that of the text shown in FIG. 14.

It is possible to input an instruction of omitting the text type determination process or the text content/domain type determination process through input device such as the keyboard by a user. In this case, if the text type determination process is omitted, the text type is recognized as a default text type, and if the text content/domain type determination process is omitted, the text content/domain type is recognized as a default text content/domain type, and the subsequent process is executed.

FIG. 24 is a drawing showing an example of the constitution of the summarization rules 18.

In this embodiment, the summarization rules 18 have a structure similar to that of the text analysis rules. Namely, the summarization rules 18 comprise a code 850 for identifying a setting item, a setting item name 851, and a text summarization rule 990. The text summarization rule 990 has a format the same as that of the text analysis rules 6. In this case, "part" indicates reference to the part of speech of a word.

FIG. 25 shows a summarization result (summary 19) for the text shown in FIG. 14 and it is translated into English as follows:

"The power of the yen rate is not stopped also in the Tokyo foreign exchange market, and one dollar reaches the level of 109 yen temporarily, and one dollar=110 yen and 51 sen which is the highest value since the war was updated.

The today's transaction was opened at one dollar=110 yen and 27 sen which is 2 sen cheaper and higher dollar compared with the closing price on the preceding day.

The closing price of yen was one dollar=110 yen and 45 sen which is 20 sen cheaper and higher dollar compared with the closing price on the preceding day. The volume was 7 billion and 314 million dollars."

Namely, the head sentence of the text and the sentences including summarization keywords "" (closing price) and " " (volume) is extracted as a summary.

FIG. 26 shows a summarization result (summary 19) for the text shown in FIG. 15 and it is translated into English as follows:

"I am ordered to go to Tokyo on business tomorrow, so that please get me a reserved seat of Shinkansen. Since I will leave the laboratory at 2 o'clock tomorrow, get a reserved ticket at a suitable time."

Namely, a sentence satisfying the rules with respect to "imperative sentence" of the text summarization rule shown in FIG. 24 is extracted as a summary.

The summary is displayed on the display unit. In this case, it is possible to display the text before summarization, the determined text type, the determined text content/domain type, and the selected text summarization method on the display unit by an instruction from the input device such as the keyboard by a user.

As mentioned above, according to this embodiment, a suitable text summarization method can be selected and set according to the constitution, field, and content of a text, so that a highly precise summarization result can be obtained without being affected so much by the constitution, field, and content of the text.

A deformation example and an expansion example of this embodiment will be explained hereunder.

In the text type identification rule acquisition process (FIG. 5) in this embodiment, it is made possible to define a weight in proportion to the significance of each attribute item.

According to this embodiment, when all the attribute values of the text type identification rule are satisfied, the text type determination process assigns the text type. However, there are few cases that all the attribute values are satisfied. Therefore, it is made possible to define a weight in proportion to the significance of each attribute item (FIG. 27), and when an attribute value of the text type identification rule is satisfied, the text type determination process adds the weight of the attribute, calculates the sum of weights of satisfied attribute values, and recognizes the text type having a maximum sum as a text type of the text.

If there is no attribute value more than a certain fixed threshold value, the text type determination process decides that the text type cannot be determined.

By doing this, it is not always necessary that all the attribute values are satisfied and the number of texts in which the text type cannot be determined reduces. The same may be said with the text content/domain type identification rule acquisition process and the text content/domain determination process.

According to the present invention, a suitable text summarization method can be selected and set according to the constitution, field, and content of a text, so that a highly precise summarization result can be obtained without being affected so much by the constitution, field, and content of the text.

According to the present invention, even when a set of texts comprising various types of texts is continuously summarized, the texts can be automatically summarized continuously without performing a manual operation such as classification of the texts and without reducing the precision.

The invention claimed is:

1. A text summarizing method in a system comprising at least a processor and a storage and summarizing an inputted text comprising:

a step of setting a text analysis rule, a plurality of text type identification rules, a plurality of summarization method setting tables, and a summarization rule in said storage;

a step of extracting at least a numerical value of conditions defined relative to text structure elements, from said inputted text by said processor on the basis of said text analysis rule;

a step of determining the text type of said inputted text, based upon the extracted numerical value and said text type identification rules;

a step of selecting a summarization method setting table corresponding to said determined text type from said summarization method setting tables; and, a step of summarizing said inputted text on the basis of said selected summarization method setting table and said summarization rule.

2. A text summarizing method according to claim 1, further comprising:

a step of setting a plurality of text content/domain type identification rules in said storage;

a step of extracting a corresponding text content/domain type identification rule on the basis of said plurality of text content/domain type identification rules and said text analysis rule;

a step of determining the text type of said extracted identification rule as a text type of said inputted text; and a step of selecting a summarization method setting table corresponding to a combination of said determined text type and said text content/domain type from said summarization method setting tables.

3. A text summarizing method according to claim 1, further comprising:

a step of informing of the text before summarization, said determined text type, and said selected text summarizing method by said output device according to an instruction of a user when said summarized text is informed of by said output device.

4. A text summarizing method according to claim 1, further comprising:

a step of presetting a default text type and a default text content/domain type and also presetting a summarization method setting table corresponding to a combination of a text type and a text content/domain type including one or both of said default text type and said default text content/domain type in said storage; and a step of recognizing said default text type as a text type when it is instructed to omit said text type determination by said input device and recognizing said default text content/domain type as a text content/domain type when it is instructed to omit said text content/domain type determination by said input device.

5. A text summarizing method in a system comprising an input device, an output device, a processor, and a storage and preparing a summary by summarizing an inputted text in an electronic form, comprising:

a step of setting a word dictionary, grammar rules, data on text attributes including a plurality of attribute items, a text analysis rule, a plurality of text type identification rules, a plurality of text content/domain type identification rules, a plurality of summarization method setting tables, and a summarization rule in said storage;

a step of analysing said inputted text in an electronic form on the basis of said word dictionary, said grammar rules, said data on text attributes, and said text analysis rule and generating a text analysis table including a word table and a text table by said processor;

a step of extracting a text type identification rule conforming to the content of said text analysis table mostly by referring to said plurality of text type identification rules and determining the text type of said extracted identification rule as a text type of said inputted text in an electronic form;

a step of extracting a text content/domain type identification rule conforming to the content of said text analysis table mostly by referring to said plurality of text content/domain type identification rules and determining the text content/domain type of said extracted identification rule as a text content/domain type of said inputted text in an electronic form;

a step of selecting a summarization method setting table corresponding to a combination of said determined text type and said text content/domain type from said plurality of summarization method setting tables; and a step of summarizing said inputted text in an electronic form on the basis of said selected summarization method setting table and said summarization rule.

6. A text summarizing method according to claim 5, further comprising:

a step of displaying said data on text attributes including a plurality of attribute items or a text type identification rule set in said storage already in said output device when said text type identification rule is set in said storage; and a step of generating or updating a text type identification rule from an identifier indicating the text type inputted from said input device, the attribute value of each attribute item, and said attribute items.

7. A text summarizing method according to claim 5, further comprising:

a step of displaying said data on text attributes including a plurality of attribute items and data on text attributes including a plurality of attribute items for text content/domain type identification or a text type identification rule set in said storage already in said output device when said text content/domain type identification rule is set in said storage; and a step of generating or updating a text content/domain type identification rule from an identifier indicating the text content/domain type inputted from said input device, the attribute value of each attribute item, and said attribute items.

8. A text summarizing method according to claim 5, wherein said text type or said text content/domain type inputted and designated from said input device is used in place of said determined text type or said determined text content/domain type.

9. A text summarizing method according to claim 5, further comprising:

a step of presetting a default text type and a default text content/domain type and also presetting a summarization method setting table corresponding to a combination of a text type and a text content/domain type including one or both of said default text type and said default text content/domain type in said storage; and a step of recognizing said default text type as a text type when it is judged that the type cannot be determined as a result of said text type determination and recognizing said default text content/domain type as a text content/domain type when it is judged that the type cannot be determined as a result of said text content/domain type determination.

10. A text summarizing system comprising at least a processor and a storage and summarizing an inputted text comprising:

a storage for storing a text analysis rule, a plurality of text type identification rules, a plurality of summarization method setting tables, and a summarization rule;

means for extracting at least a numerical value of conditions defined relative to text structure elements, from said inputted text on the basis of said text analysis rule;

means for determining the text type of said inputted text, based upon the extracted numerical value and said text type identification rules;

means for selecting a summarization method setting table corresponding to said determined text type from said summarization method setting tables; and, means for summarizing said inputted text on the basis of said selected summarization method setting table and said summarization rule.

11. A text summarizing system according to claim 10, wherein said storage further stores a plurality of text content/domain type identification rules, said system further comprising:

means for extracting a corresponding text content/domain type identification rule on the basis of said plurality of text content/domain type identification rules and said text analysis rule;

means for determining the text content/domain type of said extracted identification rule as a text content/domain type of said inputted text; and, means for selecting a summarization method setting table corresponding to a combination of said determined text type and said determined text content/domain type from said summarization method setting tables.

12. A text summarizing system according to claim 10, further comprising:

means for informing of the text before summarization, said determined text type, and said selected text summarizing method by said output device according to an instruction of a user when said summarized text is informed of by said output device.

13. A text summarizing system for preparing a summary by summarizing an inputted text in an electronic form, comprising:

a storage for storing a word dictionary, grammar rules, data on text attributes including a plurality of attribute items, a text analysis rule, a plurality of text content/domain type identification rules, a plurality of summarization method setting tables, and a summarization rule;

a text analysis module for analyzing said inputted text in an electronic form on the basis of said word dictionary, said grammar rules, said data on text attributes, and said text analysis rule and generating a text analysis table including a word table and a text table;

a text type determination module for extracting a text type identification rule conforming to the content of said text analysis table mostly by referring to said plurality of text type identification rules and determining the text type of said extracted identification rule as a text type of said inputted text in an electronic form;

a text content/domain type determination module for extracting a text content/domain type identification rule conforming to the content of said text analysis table mostly by referring to said plurality of text content/domain type identification rules and determining the text content/domain type of said extracted identification rule as a text content/domain type of said inputted text in an electronic form;

a summarization method setting module for selecting a summarization method setting table corresponding to a combination of said determined text type and said text content domain type from said plurality of summarization method setting tables; and, a text summarization module for summarizing said inputted text in an electronic form on the basis of said selected summarization setting table and said summarization rule.

14. A text summarizing system according to claim 12, further comprising:

means for displaying said data on text attributes including a plurality of attribute items or a text type identification rule set in said storage already in said output device when said text type identification rule is set in said storage, generating or updating a text type identification rule from an identifier indicating the text type inputted from said input device, the attribute value of each attribute item, and said attribute items, and setting it in said storage.

15. A text summarizing system according to claim 12, further comprising:

means for displaying said data on text attributes including a plurality of attribute items and data on text attributes including a plurality of attribute items for text content/domain type identification or a text type identification rule set in said storage already in said output device when said text content/domain type identification rule is set in said storage, generating or updating a text content/domain type identification rule from an identifier indicating the text content/domain type inputted from said input device, the attribute value of each attribute item, and said attribute items, and setting it in said storage.

16. A text summarizing system according to claim 12, wherein said text type or said text content/domain type inputted and designated from said input device is used in place of said determined text type or said determined text content/domain type.

17. A text summarizing system according to claim 12, further comprising:

means for presetting a default text type and a default text content/domain type and also presetting a summarization method setting table corresponding to a combination of a text type and a text content/domain type including one or both of said default text type and said default text content/domain type in said storage;

wherein said text type determination module recognizes said default text type as a text type when said text type determination module judges that the type cannot be determined as a result of said text type determination and said text content/domain type determination module recognizes said default text content/domain type as a text content/domain type when said text content/domain type determination module judges that the type cannot be determined as a result of said text content/domain type determination.

18. A text summarizing system according to claim 12, further comprising:

means for presetting a default text type and a default text content/domain type and also presetting a summarization method setting table corresponding to a combination of a text type and a text content/domain type including one or both of said default text type and said default text content/domain type in said storage; and means for recognizing said default text type as a text type when it is instructed to omit said text type determination by said input device and recognizing said default text content/domain type as a text content/domain type when it is instructed to omit said text content/domain type determination by said input device.

* * * * *